United States Patent
Ning et al.

(10) Patent No.: US 12,497,239 B2
(45) Date of Patent: Dec. 16, 2025

(54) TRANSPORT ROBOT, RACK AND WAREHOUSING SYSTEM

(71) Applicants: HAI ROBOTICS CO., LTD., Guangdong (CN); HAI INTELLIGENT CO., LTD., Guangdong (CN)

(72) Inventors: Kejun Ning, Guangdong (CN); Peng Gao, Guangdong (CN); Shengdong Xu, Guangdong (CN); Penghui Wang, Guangdong (CN); Yuqi Chen, Guangdong (CN)

(73) Assignees: HAI ROBOTICS CO., LTD., Shenzhen (CN); HAI INTELLIGENT CO., LTD., Shenzhen (CN)

( * ) Notice: Subject to any disclaimer, the term of this patent is extended or adjusted under 35 U.S.C. 154(b) by 0 days.

(21) Appl. No.: 19/070,444

(22) Filed: Mar. 4, 2025

(65) Prior Publication Data
US 2025/0197116 A1  Jun. 19, 2025

Related U.S. Application Data

(63) Continuation-in-part of application No. PCT/CN2024/094808, filed on May 22, 2024.

(30) Foreign Application Priority Data

May 30, 2023  (CN) .......................... 202310630207.6

(51) Int. Cl.
*B66F 9/06* (2006.01)
*B65G 1/06* (2006.01)
*B65G 1/137* (2006.01)

(52) U.S. Cl.
CPC ........... *B65G 1/065* (2013.01); *B65G 1/1373* (2013.01); *B66F 9/063* (2013.01)

(58) Field of Classification Search
CPC ........ B65G 1/065; B65G 1/1373; B66F 9/063
See application file for complete search history.

(56) References Cited

U.S. PATENT DOCUMENTS

| 12,319,502 B2 * | 6/2025 | Lert, Jr. ............... B65G 1/0478 |
| 2020/0180863 A1 * | 6/2020 | Moulin ................ B65G 1/0492 |

(Continued)

FOREIGN PATENT DOCUMENTS

| CN | 205709696 U | 11/2016 |
| CN | 110606314 A | 12/2019 |

(Continued)

OTHER PUBLICATIONS

International Search Report and Written Opinion in International Application No. PCT/CN2024/094808, issued on Aug. 19, 2024, with English translation provided by WIPO.

*Primary Examiner* — Saul Rodriguez
*Assistant Examiner* — Ashley K Romano
(74) *Attorney, Agent, or Firm* — Ladas & Parry, LLP

(57) ABSTRACT

A transport robot may include a body, a lifting assembly arranged on the body, and a first climbing assembly arranged on the lifting assembly and located on only one side of the body in a horizontal direction. The lifting assembly is configured to drive the first climbing assembly to ascend or descend. The first climbing assembly is configured to be docked with a second climbing assembly of a rack after being driven to ascend, and to climb along the second climbing assembly in a vertical direction.

21 Claims, 17 Drawing Sheets

(56) References Cited

U.S. PATENT DOCUMENTS

| | | | |
|---|---|---|---|
| 2022/0212867 A1 | 7/2022 | Wu | |
| 2022/0324648 A1* | 10/2022 | Valinsky | B65G 1/10 |
| 2023/0095494 A1* | 3/2023 | Simpson | B65G 1/0485 |
| | | | 700/216 |
| 2023/0278795 A1* | 9/2023 | Mohanarajah | B65G 1/1373 |
| | | | 414/277 |
| 2023/0286762 A1* | 9/2023 | Bangalore Srinivas | |
| | | | B65G 1/0485 |
| 2024/0101351 A1* | 3/2024 | Stevens | B65G 1/0492 |
| 2024/0140714 A1* | 5/2024 | Walti | B65G 1/0492 |
| 2024/0294333 A1* | 9/2024 | Rey | B65G 1/0492 |
| 2024/0294335 A1* | 9/2024 | Gebhardt | B65G 1/1376 |
| 2024/0336436 A1* | 10/2024 | Lerouge | B61C 11/02 |
| 2024/0336438 A1* | 10/2024 | Chatain | B65G 1/1378 |
| 2024/0391744 A1* | 11/2024 | Buscema | B66F 9/07577 |
| 2025/0033880 A1* | 1/2025 | Moulin | B65G 1/065 |
| 2025/0171240 A1* | 5/2025 | Austrheim | B65G 43/00 |

FOREIGN PATENT DOCUMENTS

| | | | |
|---|---|---|---|
| CN | 111731727 A | 10/2020 | |
| CN | 108349652 B | 7/2021 | |
| CN | 114555491 A | 5/2022 | |
| CN | 216613881 U | 5/2022 | |
| CN | 217625532 U | 10/2022 | |
| CN | 115367358 A | 11/2022 | |
| CN | 217866247 U | 11/2022 | |
| CN | 218143638 U | 12/2022 | |
| CN | 220431166 U | 2/2024 | |
| WO | 2020220948 A1 | 11/2020 | |

\* cited by examiner

TRANSPORT ROBOT, RACK AND WAREHOUSING SYSTEM

CROSS-REFERENCE TO RELATED APPLICATIONS

This application is a continuation-in-part of International Patent Application No. PCT/CN2024/094808 filed on May 22, 2024, which claims priority to Chinese Patent Application No. 202310630207.6 filed on May 30, 2023, the disclosures of which are incorporated herein by reference in their entireties.

TECHNICAL FIELD

This application relates to the field of logistics transportation technologies, and in particular, to a transport robot, a rack, a warehousing system, and a docking method.

BACKGROUND OF THE INVENTION

A transport robot is an essential part of an automated and intelligent warehousing system. The existing transport robot may climb on a rack to retrieve or place goods. However, the existing transport robot cannot travel under the rack, thereby reducing movement efficiency.

SUMMARY OF THE INVENTION

An objective of this application is to provide a transport robot, a rack, a warehousing system, and a docking method, so that the transport robot is able to pass through a channel under the rack.

In some embodiments, a transport robot includes a body, a lifting assembly arranged on the body, and a first climbing assembly arranged on the lifting assembly and located on only one side of the body in a horizontal direction. The lifting assembly is configured to drive the first climbing assembly to ascend or descend. The first climbing assembly is configured to be docked with a second climbing assembly of a rack after being driven to ascend, and to climb along the second climbing assembly in a vertical direction.

In some embodiments, a rack includes a storage body, a plurality of support columns arranged at a bottom of the storage body, and a plurality of second climbing assemblies arranged on the storage body. The rack defines a plurality of storage locations. The plurality of support columns are configured to support the storage body. Each second climbing assembly extends along a vertical direction and being configured to fit with a transport robot. A distance between adjacent second climbing assemblies is less than a width of the transport robot to allow the transport robot to fit with the adjacent second climbing assemblies, such that the transport robot is capable of climbing along the adjacent second climbing assemblies. A distance between adjacent support columns is greater than the width of the transport robot to allow the transport robot to pass between the adjacent support columns.

In some embodiments, a warehousing system may include a transport robot and a rack. The transport robot includes a robot body and a first climbing assembly connected to the robot body and capable of ascending or descending relative to the robot body. The rack includes a rack body configured to store a material and a second climbing assembly arranged on the rack body. The rack body defines a channel, at a bottom of the rack body. The transport robot is able to pass through the channel when the transport robot transports a material. The second climbing assembly extends in a vertical direction. A bottom end of the second climbing assembly has a height equal to or greater than a height of the channel. The first climbing assembly is configured to ascend to be docked with the second climbing assembly to allow the transport robot to climb on the rack.

Figure 1:
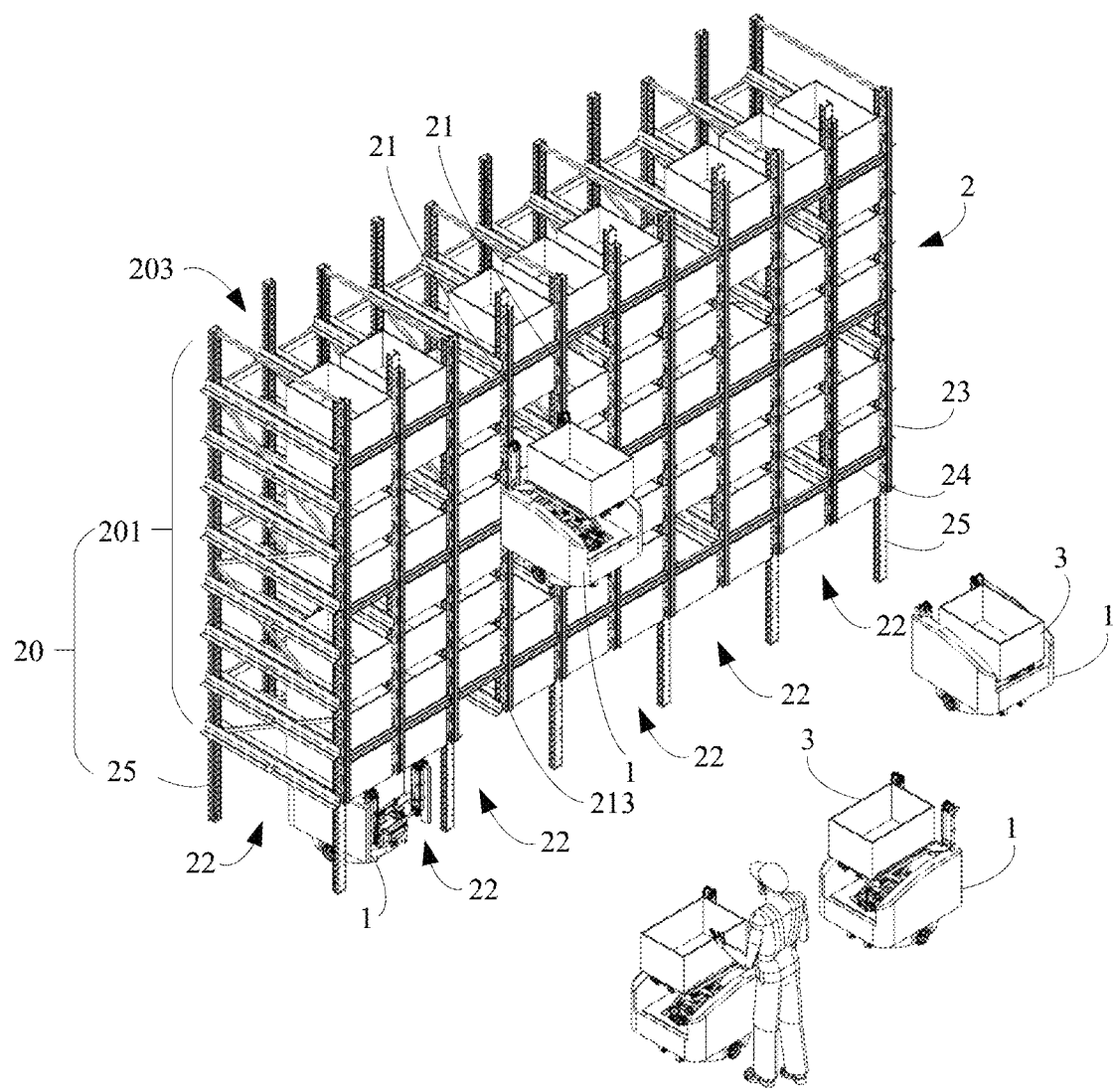
FIG. 1 is a schematic structural diagram of a warehousing system according to an embodiment of the present disclosure.

Reference numbers in the drawings are listed as below:
1, 1', 1a, 1b, 1c, 1d, 1e-Transport robot; 11-Body; 111-Turntable; 112-Chassis assembly; 112a-Walking wheel assembly; 112b-Chassis housing; 12-Lifting assembly; 121-First connecting rod; 122-Second connecting rod; 123-Driving rod; 124-Fourth driver; 13, 13'-First climbing assembly; 130-synchronous belt; 131-First driver; 132-Chain wheel; 133-First driven wheel; 134-Second driven wheel; 135-Transmission belt; 136-Support arm; 1361-first end; 1362-second end; 1363-first connecting arm; 1363a-third side; 1364-second connecting arm; 1364a-fourth side; 137-First roller; 138-Second roller; 139-protrusion; 14-Fork assembly; 141-Base; 142-telescopic fork; 143-projections; 15-Second driver; 16-Third driver;

2, 2'-Rack; 20-rack body; 201-sotrage body; 203-storage location; 21, 21'-Second climbing assembly; 211-Mounting base; 2111-Groove; 2111a-First surface; 2112-Guide rib; 2112a-second surface; 2113-side wall; 2114-base wall; 2115-wing; 212-Chain; 213-bottom end; 22-Channel; 23, 23'-Longitudinal beam; 24-Transverse beam; 25-Support column; 26-mouting base; 261-base wall; 262-side wall; 263-wing; 264-groove; and

3-Container.

Accompanying drawings herein are incorporated into and constitute a part of this specification, show embodiments that conform to the present disclosure, and are used together with this specification to describe the principle of the present disclosure.

DETAILED DESCRIPTION

To make the objectives, technical solutions, and advantages of this application clearer and more understandable, this application is further described in detail below with reference to the accompanying drawings and the embodiments. It should be understood that the specific embodiments described herein are only used for explaining this application, and are not used for limiting this application.

In the description of this application, unless otherwise explicitly specified and defined, the terms "first", and "second" are merely used for a purpose of description, but shall not be understood as an indication or implication of relative importance. Unless otherwise specified or described, the term "a plurality of" means two or more than two. The terms such as "connection", and "fixing" shall be understood in a broad sense. For example, the term "connection" may mean a fixed connection, a detachable connection, an integrated connection, or an electrical connection. The term "connection" may also mean a direct connection, or an indirect connection through an intermediate component. The term "direct connection" means no intermediate components exist. The term "indirect connection" means one or more intermediate components exist therebetween. For example, "a component A is indirectly connected to a component B" means that there is another component C and the component A is connected to the component B via the component C. In some embodiments, the terms "connect", "couple", "install" and "mount" may be used in an interchangeable manner. A person of ordinary skill in the art may understand specific meanings of the foregoing terms in this application according to specific situations.

In the description of this specification, it should be understood that, in the embodiments of this application, orientation terms such as "upper" and "lower" are described from a perspective shown in the accompanying drawings, and shall not be construed as a limitation on the embodiments of this application. In addition, in the context, it should be further understood that when an element is mentioned as being connected "on" or "under" another element, the element can be not only directly connected "on" or "under" the another element, but also may be indirectly connected "on" or "under" the another element through an intermediate element.

An embodiment of the present disclosure provides a transport robot 1 as shown in FIGS. 1-15. The transport robot 1 can climb on the rack 2 and is able to pass under the rack 2. FIG. 1 is a schematic structural diagram of a warehousing system according to an embodiment of the present disclosure. Referring to FIG. 1, the transport robot 1 may be used in the warehousing system. Specifically, the transport robot 1 may be configured to temporarily store a container 3, or may move on the ground to transfer a container 3. The transport robot 1 may also climb on a rack 2 to retrieve or place a container 3.

Referring to FIG. 1, the warehousing system includes a rack 2, and the rack 2 includes a transverse beam 24 and a longitudinal beam 23. The transverse beam 24 and the longitudinal beam 23 may be cross-connected to form a plurality of storage locations 203 for storing containers on the rack 2. There may be a plurality of storage locations 203 in a direction parallel to the ground and a direction perpendicular to the ground. The rack 2 has a certain height, and the transport robot 1 may climb up and down on the rack 2 to reach a target storage location to retrieve or place the container 3.

It needs to be understood that the forms of the container are not limited in embodiments of the present application. For example, the container may be any item holder, such as a carton, a box, a bin, or a pallet, which may contain or hold one or more items, goods or articles. In some embodiments, the container may also be the item, the goods or the article.

It needs to be understood that the forms of the rack are also not limited in embodiments of the present application as long as the transport robot 1 can travel under the rack. For example, the rack may be a rack with a single shelf, or a rack with a plurality of shelves. In an embodiment, the shelf of the rack may include a flat board for supporting and storing the container 3. In some other embodiments, the shelf may include transverse bars spaced apart one another by a distance, and two adjacent transverse bars can jointly support the container 3 thereon.

It should be noted that the term "and/or" used in embodiments of the present application includes any and all combinations of one or more related items listed. For example, "A and/or B" may include "A and B", "only A", or "only B".

In an embodiment, the transport robot 1 as shown in FIGS. 1-11 can dock with the rack 2 in midair, so that a second climbing assembly 21 on the rack 2 does not need to extend to the bottom of the rack 2. It should be noted that, "docking in midair" in the present disclosure means that docking between the second climbing assembly 21 of the rack 2 and the transport robot 1 is achieved through ascending at least a part of the transport robot 1. For example, the first climbing assembly 13 needs to raise so as to dock with the second climbing assembly 21. In this way, space at the bottom of the rack 2 can be released, and the transport robot 1 can pass through a channel under the rack 2, thereby shortening a walking distance of the transport robot 1 between two sides of the rack 2 and improving carrying efficiency. The transport robot 1 travels or passes under the rack 2 means that the bottom of the rack 2 does not obstruct movement of the transport robot 1 and the transport robot 1 walks in a channel 22 formed at the bottom of the rack 2.

Figure 2:
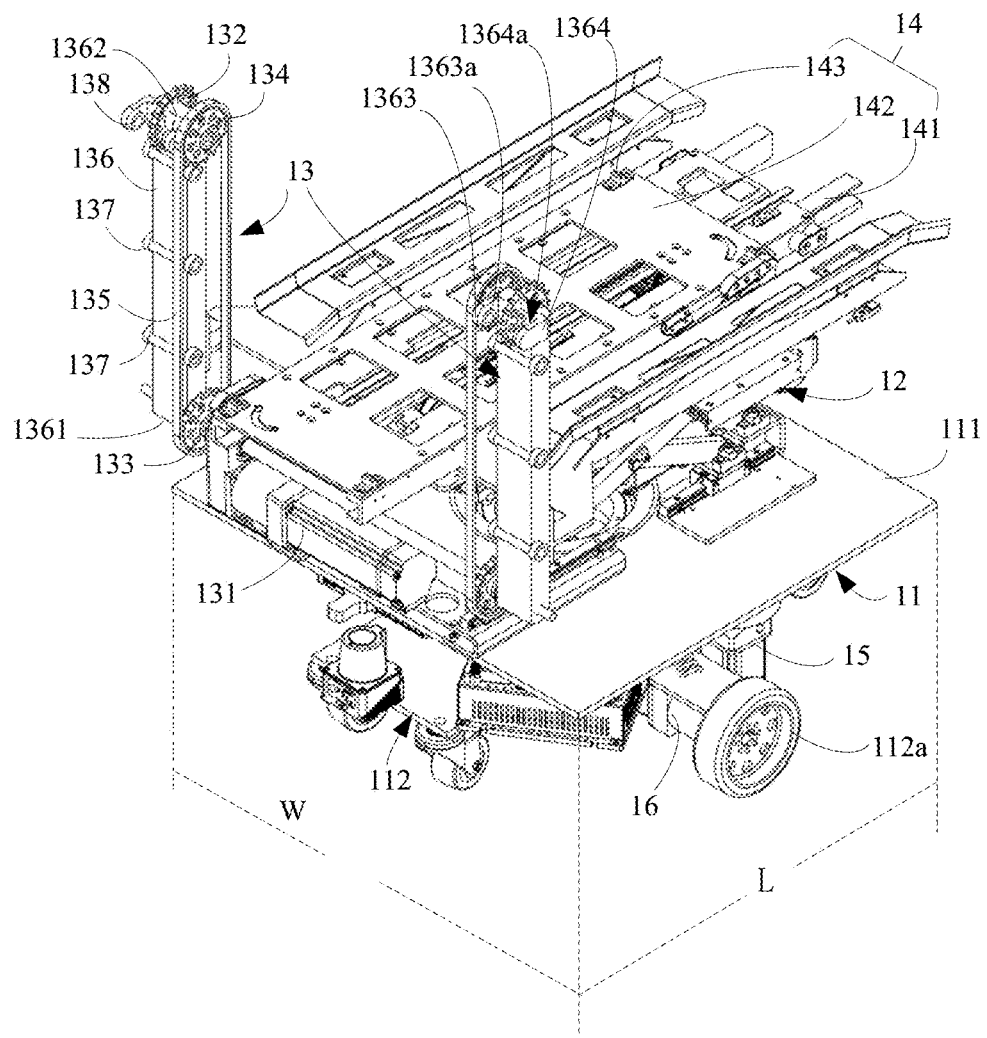
FIG. 2 is a schematic structural diagram of a transport robot according to an embodiment of the present disclosure (with a housing hidden)

Specifically, FIG. 2 is a schematic structural diagram of a transport robot 1 according to an embodiment of the present disclosure (with a housing hidden). Referring to FIG. 2, the transport robot 1 includes a body (also called robot body) 11, a lifting assembly 12, and a first climbing assembly 13. A plurality of devices and structures may be integrated on the body 11. For example, a wheel assembly is arranged at a bottom of the body 11, to facilitate movement of the transport robot 1 on the ground. For another example, both the lifting assembly 12 and the first climbing assembly 13 may be arranged on the body 11, so that the lifting assembly 12 and the first climbing assembly 13 move synchronously with the body 11. The transport robot 1 has a width W and a length L as shown in FIG. 2.

Specifically, a part of the lifting assembly 12 may be connected to the body 11 and located above the body 11, or may be connected to a side or another part of the body 11, so that a part of the lifting assembly 12 for supporting the first climbing assembly 13 and the container 3 can be located above the body 11, so as to move up and down above the body 11.

Specifically, the first climbing assembly 13 is located on a side of the body 11 in a horizontal direction. The first climbing assembly 13 is connected to the lifting assembly 12. Therefore, the first climbing assembly 13 can be controlled to ascend or descend by the lifting assembly 12 so as to dock with the second climbing assembly 21 of the rack 2 in a vertical direction, and climb on the rack 2 in the vertical direction. The horizontal direction is a direction parallel to the ground, and the vertical direction is a direction perpendicular to the ground and is consistent with a height direction of the rack 2. The transport robot 1 can retrieve the container 3 from a storage location 203 at a specific height position of the rack 2 or place the container 3 on a storage location 203 at a particular height position of the rack 2 based on the following process.

Figure 3:
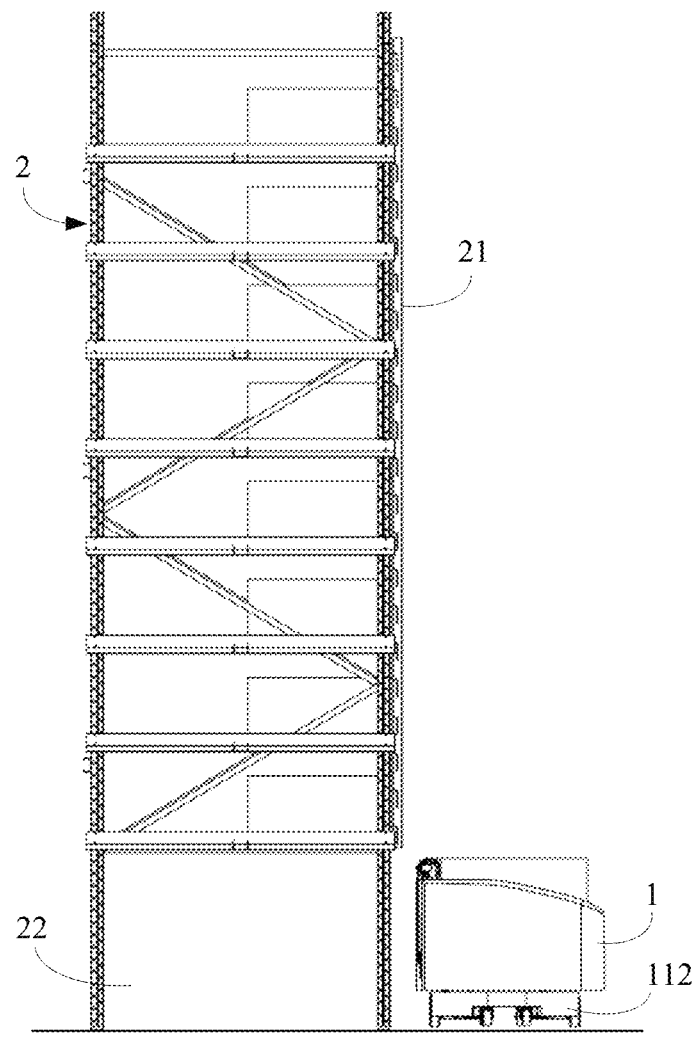
FIG. 3 is a schematic diagram of a transport robot walking below a target storage location.

FIG. 3 is a schematic diagram of the transport robot 1 walking below a target storage location. Referring to FIG. 3, the transport robot 1 may walk on the ground to a position below the target storage location.

Figure 4:
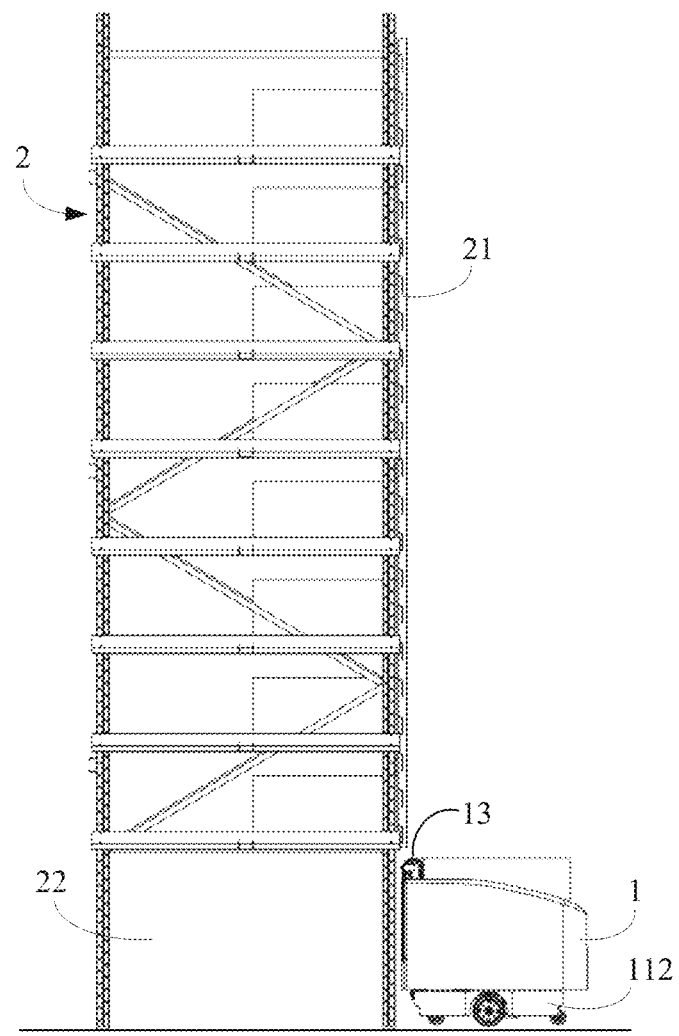
FIG. 4 is a schematic diagram of position alignment between a first climbing assembly and a second climbing assembly.

FIG. 4 is a schematic diagram showing that the first climbing assembly 13 and the second climbing assembly 21 are aligned in the vertical direction. Referring to FIG. 4, the transport robot 1 is controlled to adjust a position, so that the first climbing assembly 13 of the transport robot 1 is aligned with the second climbing assembly 21 on the rack 2 in the vertical direction.

Figure 5:
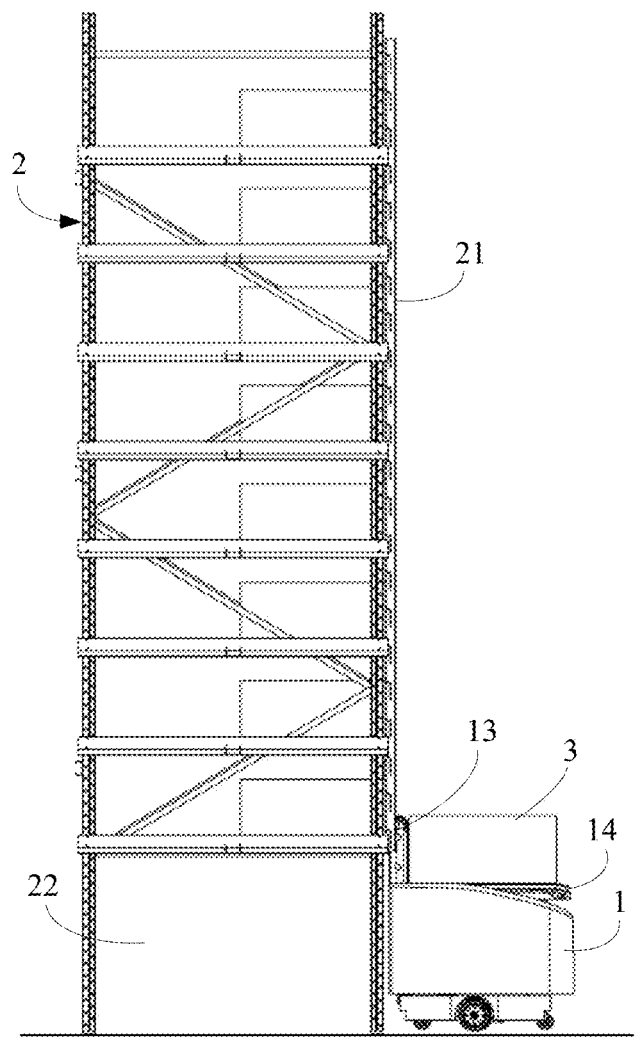
FIG. 5 is a schematic diagram of a first climbing assembly being docked with a second climbing assembly after a lifting assembly is lifted.

FIG. 5 is a schematic diagram of the first climbing assembly 13 being docked with the second climbing assembly 21 after the lifting assembly 12 is lifted. Referring to FIG. 5, the lifting assembly 12 may be controlled to drive the first climbing assembly 13 to ascend, so that the first climbing assembly 13 is docked with the second climbing assembly 21.

Figure 6:
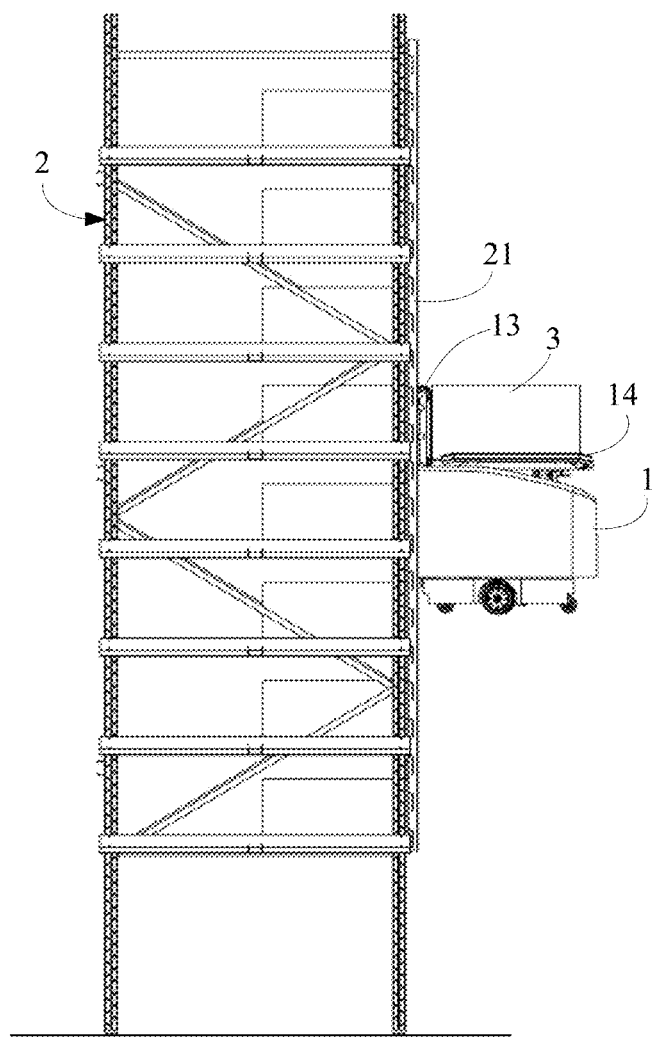
FIG. 6 is a schematic diagram of a transport robot climbing to a target storage location.
Figure 7:
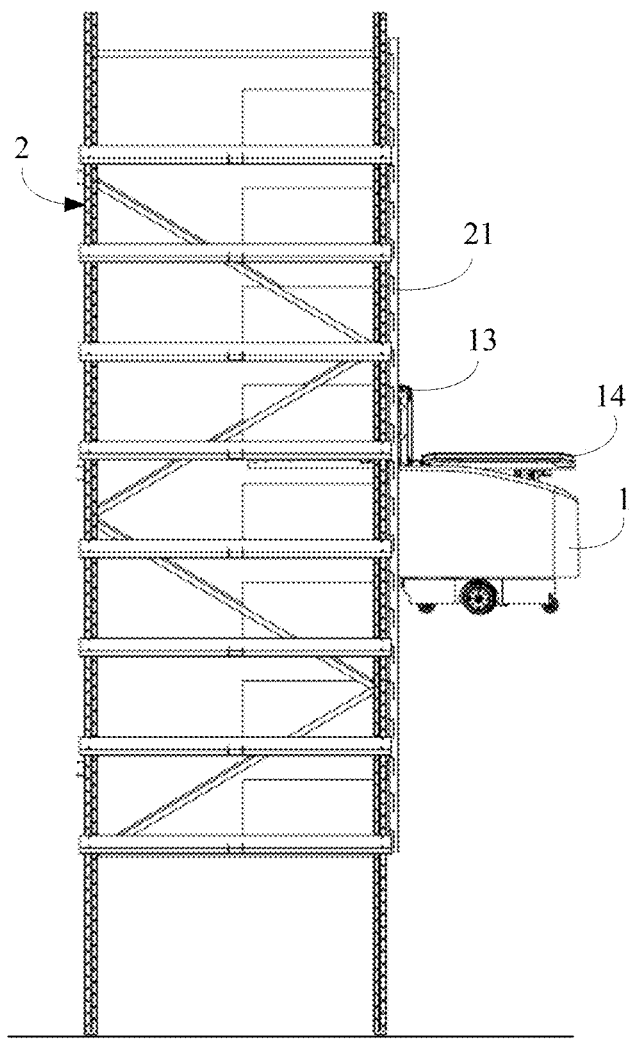
FIG. 7 is a schematic diagram of a transport robot after placing a container.

FIG. 6 is a schematic diagram of the transport robot 1 climbing to a target storage location, and FIG. 7 is a schematic diagram of the transport robot 1 after placing a container 3. Referring to FIG. 6 and FIG. 7, after the first climbing assembly 13 and the second climbing assembly 21 are docked, the first climbing assembly 13 may be controlled to move, so that the first climbing assembly 13 can climb upward along the second climbing assembly 21 and move to the target storage location to retrieve or place the container 3. FIG. 6 exemplarily shows a process of placing the container 3 on the target storage location, and FIG. 7 exemplarily shows a state after the container 3 is placed.

Figure 8:
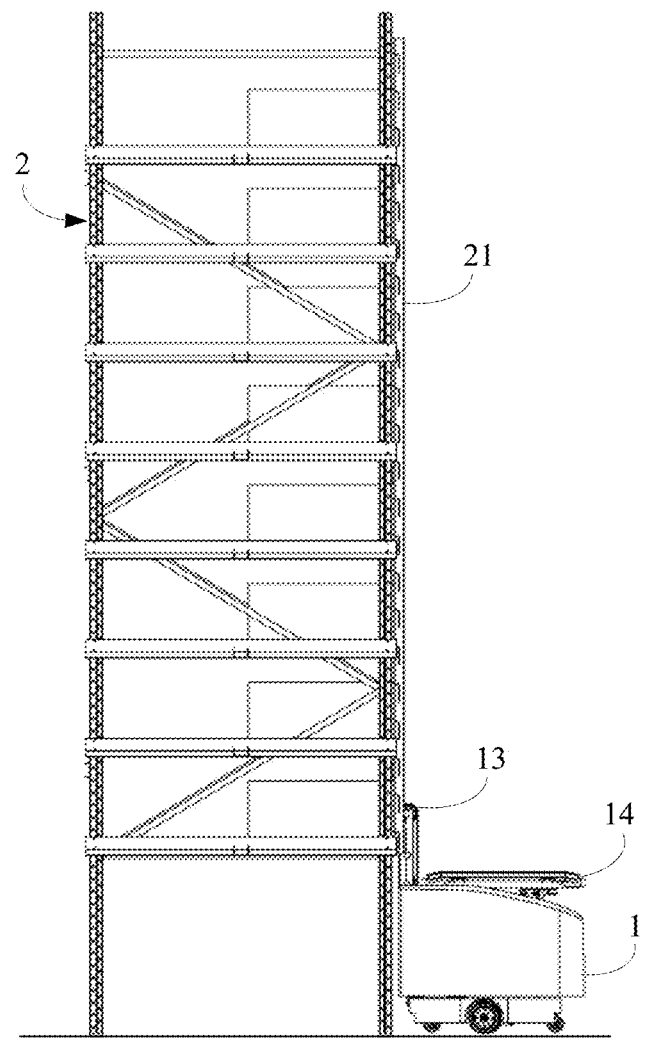
FIG. 8 is a schematic diagram of a transport robot returning to the ground.

FIG. 8 is a schematic diagram of the transport robot 1 returning back to the ground. Referring to FIG. 8, after the container 3 is retrieved or placed, the first climbing assembly 13 may be controlled to climb downward along the second climbing assembly 21, until the transport robot 1 stably reaches the ground.

Figure 9:
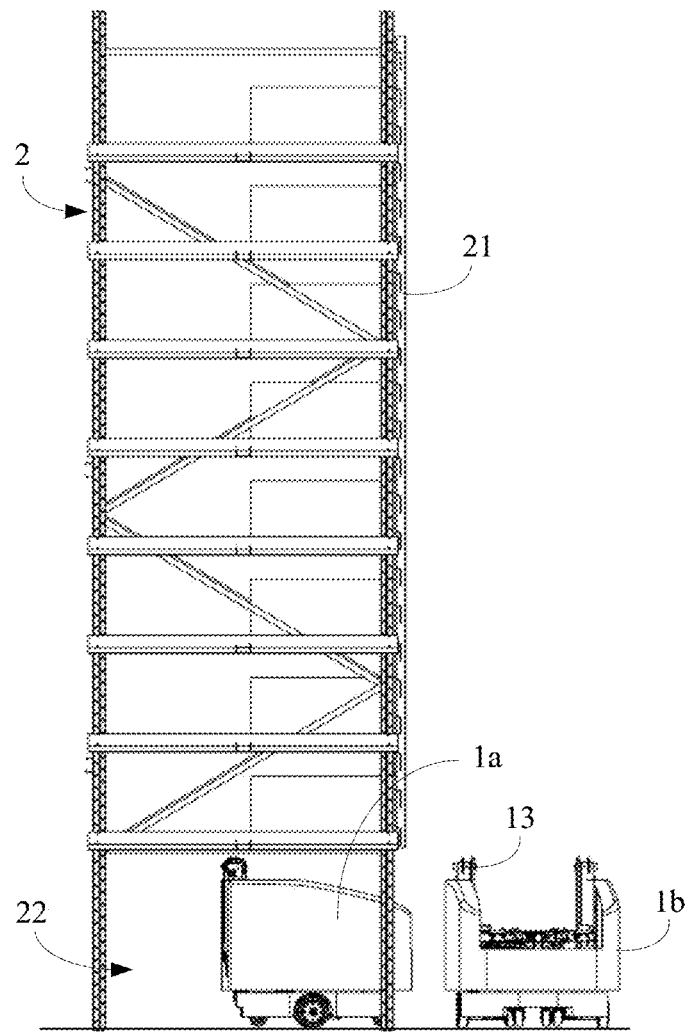
FIG. 9 is a schematic diagram of a transport robot walking on the ground after a lifting assembly returns to an original position.

Then, the lifting assembly 12 may be controlled to drive the first climbing assembly 13 to descend, so that the first climbing assembly 13 is separated from the second climbing assembly 21. FIG. 9 is a schematic diagram of the transport robot 1 walking on the ground after the lifting assembly 12 returns to an original position. Referring to FIG. 9, the transport robot 1 may walk on the ground to prepare for retrieving or placing a container 3 next time.

For example, after the transport robot 1 is separated from the rack 2, the transport robot 1 (e.g., the transport robot 1a shown in FIG. 9) may pass through a channel 22 under the rack 2. The transport robot 1 (e.g., the transport robot 1b shown in FIG. 9) may also turn by 90 degrees and then move along an aisle formed by racks after the transport robot 1 is released from the rack 2.

The transport robot 1 provided in the embodiment could dock with the rack 2 in the midair through the adjustment of raising or lowering the first climbing assembly 13 of the transport robot 1, thereby releasing space at the bottom of the rack 2 for the transport robot 1 to pass through the released space under the rack 2. In this way, a walking distance of the transport robot 1 between two sides of the rack 2 can be shortened, thereby improving carrying efficiency.

In an embodiment, as shown in FIG. 2, the first climbing assembly 13 is arranged on one side of the body 11 in the horizontal direction. Specifically, the first climbing assembly 13 is located on only one side of the body 11 in the horizontal direction. That is to say, the first climbing assembly 13 is located on one side of the robot body 11, while other sides of the robot body 11 are free of the first climbing assembly 13 (e.g., as shown in FIG. 2, no climbing assembly is amounted on other sides of the robot body 11). Therefore, the transport robot 1 can climb on the rack 2 after only one side of the transport robot 1 is docked with the rack 2. It is not necessary to support the transport robot 1 by two racks 2, thereby expanding application scenarios of the transport robot 1. In this way, when there is only one rack 2 or a width between two racks 2 is greater than the width or length of the robot 1, the container 3 can still be retrieved or placed through the climbing of the transport robot 1. Furthermore, in this way, there is no need to arrange at least two racks 2, thereby improving arrangement flexibility of the rack 2.

In a specific implementation, referring to FIG. 2, the first climbing assembly 13 includes a first driver 131, a transmission mechanism, and a first engaging mechanism. Two ends of the transmission mechanism are respectively in transmission connection with the first driver 131 and the first engaging mechanism. The first driver 131 controls, through the transmission mechanism, the first engaging mechanism to move. The first engaging mechanism is configured to be engaged with the second climbing assembly 21, so that the transport robot 1 climbs on the rack 2 in the vertical direction.

The transmission mechanism has a certain height in the vertical direction, so that stability of the transport robot 1 when climbing on the rack 2 can be improved. For example, in some embodiments, the first engaging mechanism includes a chain wheel 132. The chain wheel 132 is configured to be engaged with the second climbing assembly 21 on the rack 2, and can drive the transport robot 1 as a whole to climb on the rack 2. The chain wheel 132 may include a gear wheel in some embodiments. The chain wheel 132 includes a plurality of teeth. To enable the second climbing assembly 21 to fit with the chain wheel 132, for example, the second climbing assembly 21 may include a toothed rack or a chain 212, so that the second climbing assembly 21 can be engaged with the teeth of the chain wheel 132. When the chain wheel 132 is driven to rotate, the chain wheel 132 may climb upward or downward along the toothed rack or the chain 212. In addition, for ease of driving, the first driver 131 may be an electric motor.

Figure 17:
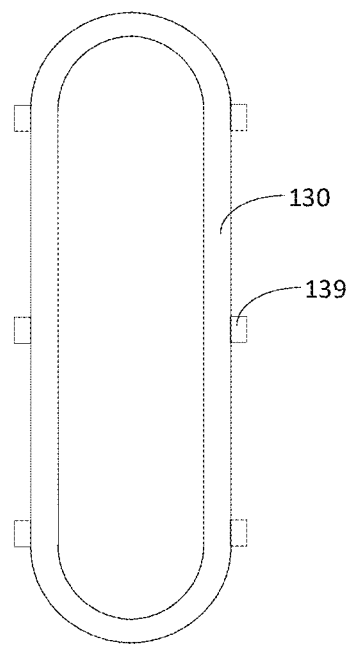
FIG. 17 is a schematic structural diagram the first engaging mechanism of the transport robot according to an embodiment of the present disclosure.

In an embodiment, as shown in FIG. 17, the first engaging mechanism includes a synchronous belt 130, rather than the chain wheel 132. A plurality of protrusions 139 are arranged on the synchronous belt 130. The synchronous belt 130 is engaged with the second climbing assembly 21 through the protrusions 139, so that the transport robot 1 climbs on the rack 2 in the vertical direction. The second climbing assembly 21 includes a rail. The rail may be mounted on the longitudinal beam 23 of the rack 2 and can extend in the vertical direction. A plurality of grooves are provided on the rail in the vertical direction. The grooves can fit with the protrusions 139 on the synchronous belt 130 in the transport robot 1, so that the transport robot 1 climbs on the rack 2 in the vertical direction. In this way, the plurality of protrusions 139 are configured to be engaged with the second climbing assembly 21. Specifically, the plurality of protrusions 139 are configured to engage with the grooves on the rail. In some other embodiments, the rail is provided with a plurality of protrusions, rather than a plurality of grooves. The protrusions 139 on the synchronous belt 130 are configured to engage with the protrusions on the rail so that the transport robot 1 can climb on the rack 2, just like climbing a ladder.

In a specific implementation, referring to FIG. 2, the transmission mechanism includes a first driven wheel 133, a second driven wheel 134, and a transmission belt 135. The first driven wheel 133 is coaxially connected to a driving shaft of the first driver 131. The second driven wheel 134 is coaxially connected to the chain wheel 132. The first driven wheel 133 and the second driven wheel 134 are in transmission connection through the transmission belt 135.

The first driven wheel 133 and the second driven wheel 134 may be respectively located at two ends of the transmission mechanism in the vertical direction. Two ends of the transmission belt 135 may be wound around the first driven wheel 133 and the second driven wheel 134. Teeth on an inner side of the transmission belt 135 may be engaged with the first driven wheel 133 and the second driven wheel 134 respectively. When the first driver 131 controls the first driven wheel 133 to rotate, rotation movement of the first driven wheel 133 may be transmitted to the second driven wheel 134 through the transmission belt 135, so that the second driven wheel 134 rotates synchronously. In addition, because the second driven wheel 134 is coaxially connected to the chain wheel 132, the second driven wheel 134 may drive the chain wheel 132 to rotate synchronously, thereby implementing climbing of the transport robot 1 on the rack 2 through fitting between the chain wheel 132 and the second climbing assembly 21.

In a specific implementation, referring to FIG. 2, the first climbing assembly 13 further includes a support arm 136. The chain wheel 132 is rotatably arranged at an end of the support arm 136 away from the body 11. In some embodiments, the support arm 136 may include a first end 1361 and a second end 1362 opposite to the first end 1361. The first end 1361 is connected to the body 11, the second end 1362 is higher than the body 11. At least a part of the first engaging mechanism is located at the second end 1362. For example, the chain wheel 132 is rotatably arranged on the second end 1362.

Figure 10:
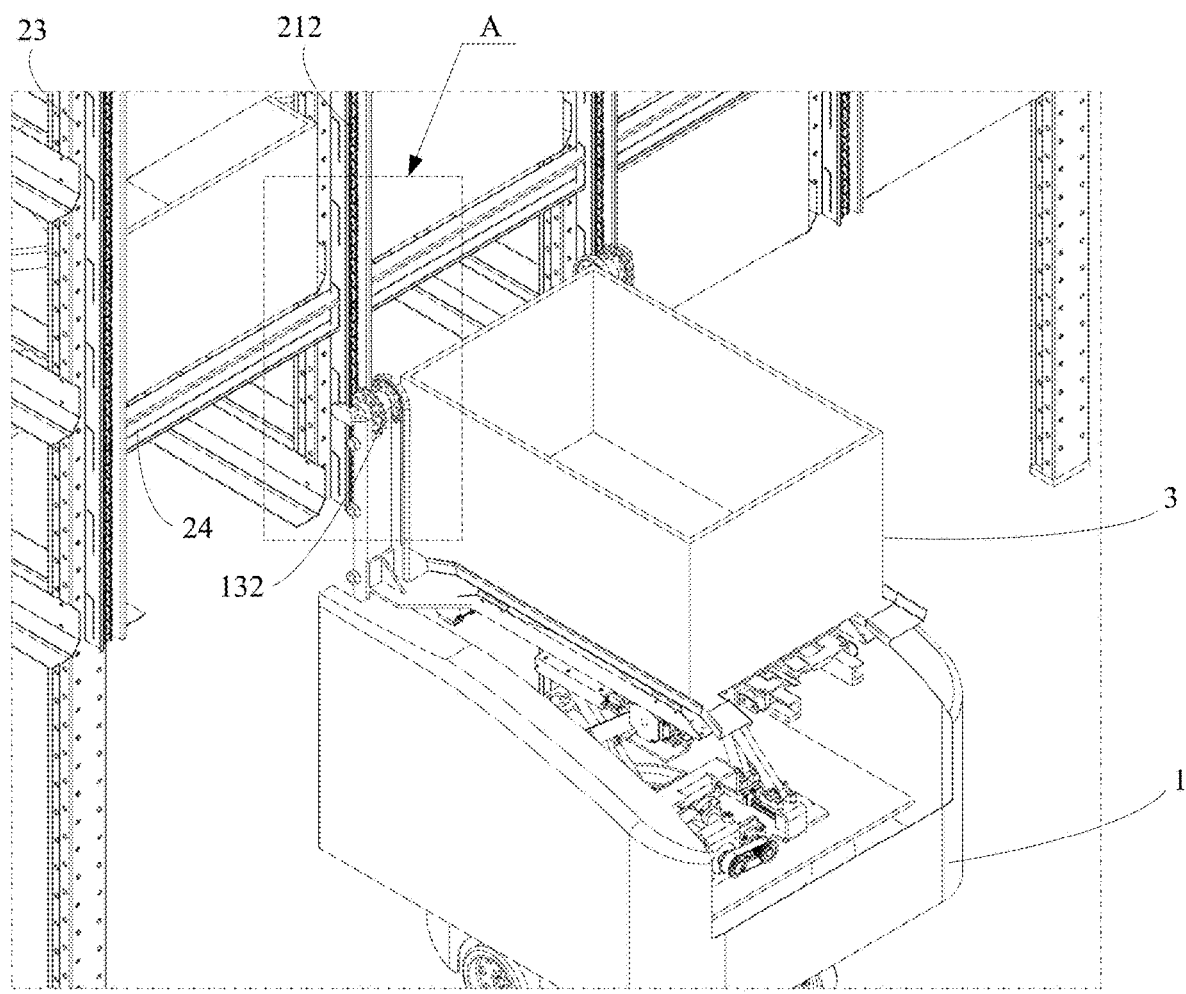
FIG. 10 is a diagram of a state in which a first climbing assembly fits with a second climbing assembly.
Figure 11:
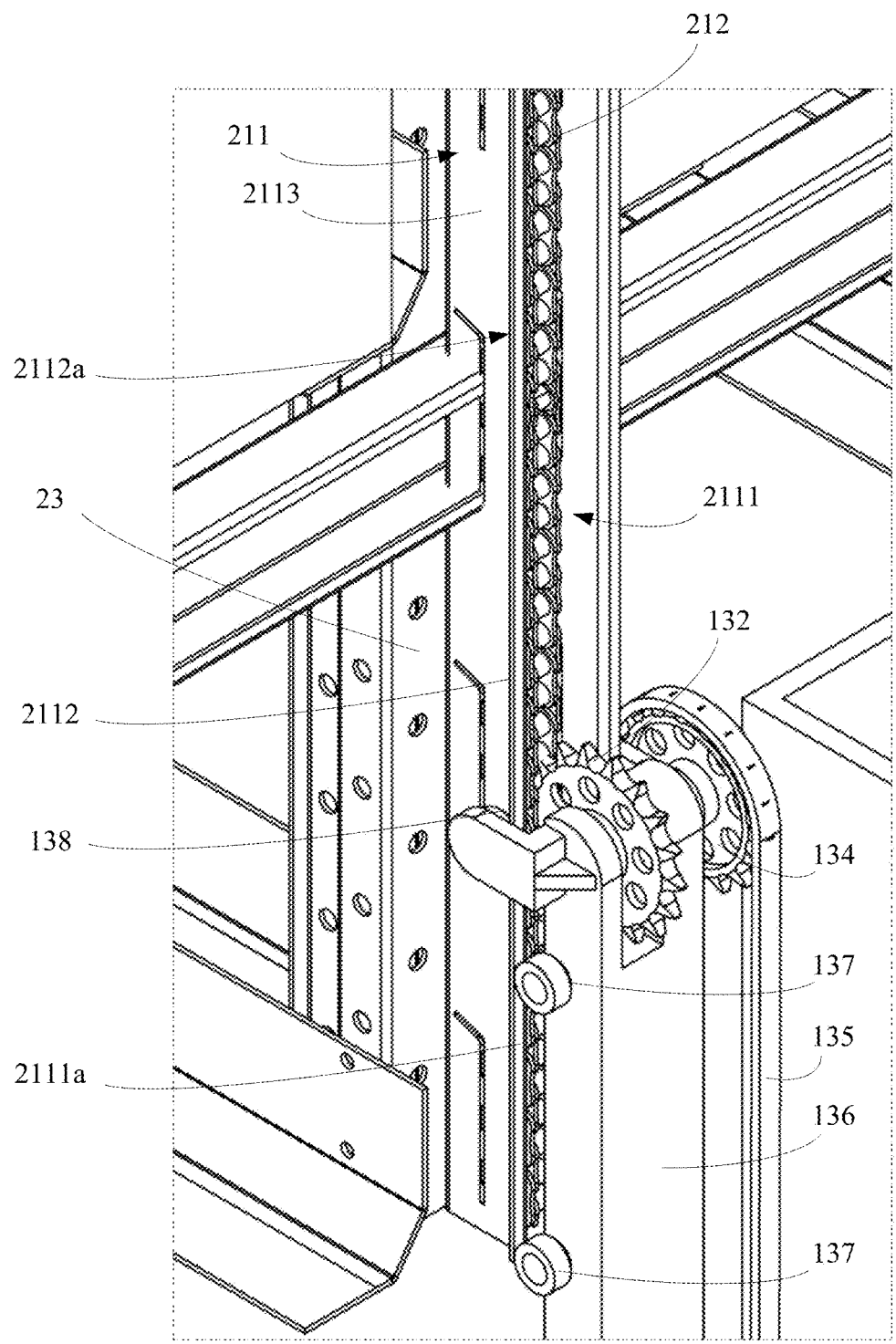
FIG. 11 is an enlarged view of a position A in FIG. 10.

A first roller 137 and/or a second roller 138 are arranged on the support arm 136. FIG. 10 is a diagram of a state in which the first climbing assembly 13 fits with the second climbing assembly 21. FIG. 11 is an enlarged view of a position A in FIG. 10. Referring to FIG. 10 and FIG. 11, a first surface 2111a is arranged on a side of the second climbing assembly 21 that fits with the first climbing assembly 13, and the first roller 137 is configured to be in rolling contact with the first surface 2111a. A second surface 2112a is arranged on a side of the second climbing assembly 21 facing away from the side that fits with the first climbing assembly 13, and the second roller 138 is configured to be in rolling contact with the second surface 2112a.

Figure 18:
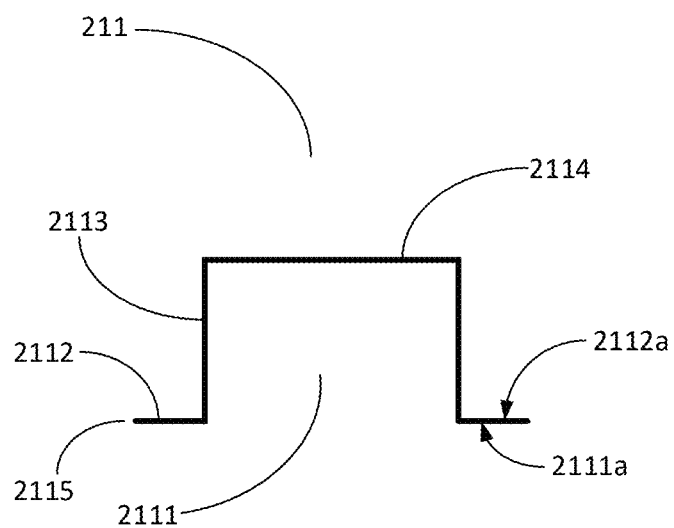
FIG. 18 is a schematic structural diagram of the cross section of a mounting base in the second climbing assembly according to an embodiment of the present disclosure.

In an embodiment, as shown in FIG. 11 together with FIG. 18, the second climbing assembly 21 includes a Q shaped mounting base 211. The mounting base 211 may act as a rail to guide the transport robot 1 to move on the rack 2. The mounting base 211 is mounted on the longitudinal beam 23. The mounting base 211 has a groove 2111, and the toothed rack or a chain 212 is mounted in the groove 2111. The groove 2111 is formed by the base wall 2114 and the side walls 2113. The side wall 2113 is provided with a wing 2115. The wing 2115 is substantially parallel to the base wall 2114 and has the first surface 2111a and the second surface 2112a. The first surface 2111a faces an aisle formed by racks 2, and the second surface 2112a orientates inside the rack 2.

In some embodiments, the first climbing assembly 13 may include the first roller 137 arranged on the support arm 136. The first roller 137 may be configured to be in rolling contact with the second climbing assembly 21 (e.g., the first surface 2111a of the second climbing assembly 21) that faces the transport robot 1, when the transport robot 1 climbs along the second climbing assembly 21.

In some embodiment, the first climbing assembly 13 may include a plurality of first rollers 137. The plurality of first rollers 137 may be spaced apart from each other. As shown in FIG. 2, there are three pairs of the first rollers 137 arranged on the support arm 136. For each pair of the first rollers 137, one first roller 137 is arranged on a first side of the support arm 136, another first roller 137 is arranged on a second side of the support arm 136. The first side is opposite to the second side.

In some embodiment, the first climbing assembly 13 may further include the second roller 138 arranged on the support arm 136. The second roller 138 may be configured to be in rolling contact with the second climbing assembly 21(e.g., the second surface 2112a of the second climbing assembly 21) that faces away from the transport robot 1, when the first climbing assembly 13 climbs along the second climbing assembly 21.

In some embodiment, as shown in FIG. 2, the first climbing assembly 13 may include a pair of second rollers 138. Specifically, the second end 1362 of the support arm 136 may be provided with a first connecting arm 1363 and a second connecting arm 1364 spaced apart from the first connecting arm 1363. The first connecting arm 1363 has a third side 1363a, the second connecting arm 1363 has a fourth side 1364a facing the third side 1363a. One of the pair of the second rollers 138 is arranged on the third side 1363a, the other one of the pair of the second rollers 138 is arranged on the fourth side1364a.

When the transport robot 1 as a whole climbs along the rack 2 through fitting between the chain wheel 132 and the second climbing assembly 21, the first roller 137 and/or the second roller 138 on the support arm 136 can come into contact with the second climbing assembly 21, and can roll through an action of a friction force with the second climbing assembly 21. In this way, stability of climbing up and down of the transport robot 1 can be ensured through the first roller 137 and/or the second roller 138, and furthermore, through rolling of the rollers, the friction force between the roller and the second climbing assembly 21 can be reduced, thereby reducing climbing resistance of the transport robot 1.

In some embodiments, only one of the first roller 137 and the second roller 138 is arranged on the support arm 136. In some other embodiments, both the first roller 137 and the second roller 138 are arranged on the support arm 136. To improve the stability of climbing of the transport robot 1 on the rack 2, both the first roller 137 and the second roller 138 may be arranged on the support arm 136, and may be configured to be in rolling contact with the second climbing assembly 21 when the transport robot 1 climbs on the rack 2. A direction of an acting force of the first roller 137 on the first surface 2111a is opposite to a direction of an acting force of the second roller 138 on the second surface 2112a, so that some parts on the second climbing assembly can be clamped between the first roller 137 and the second roller 138, thereby preventing the transport robot 1 from shaking during climbing.

Figure 12:
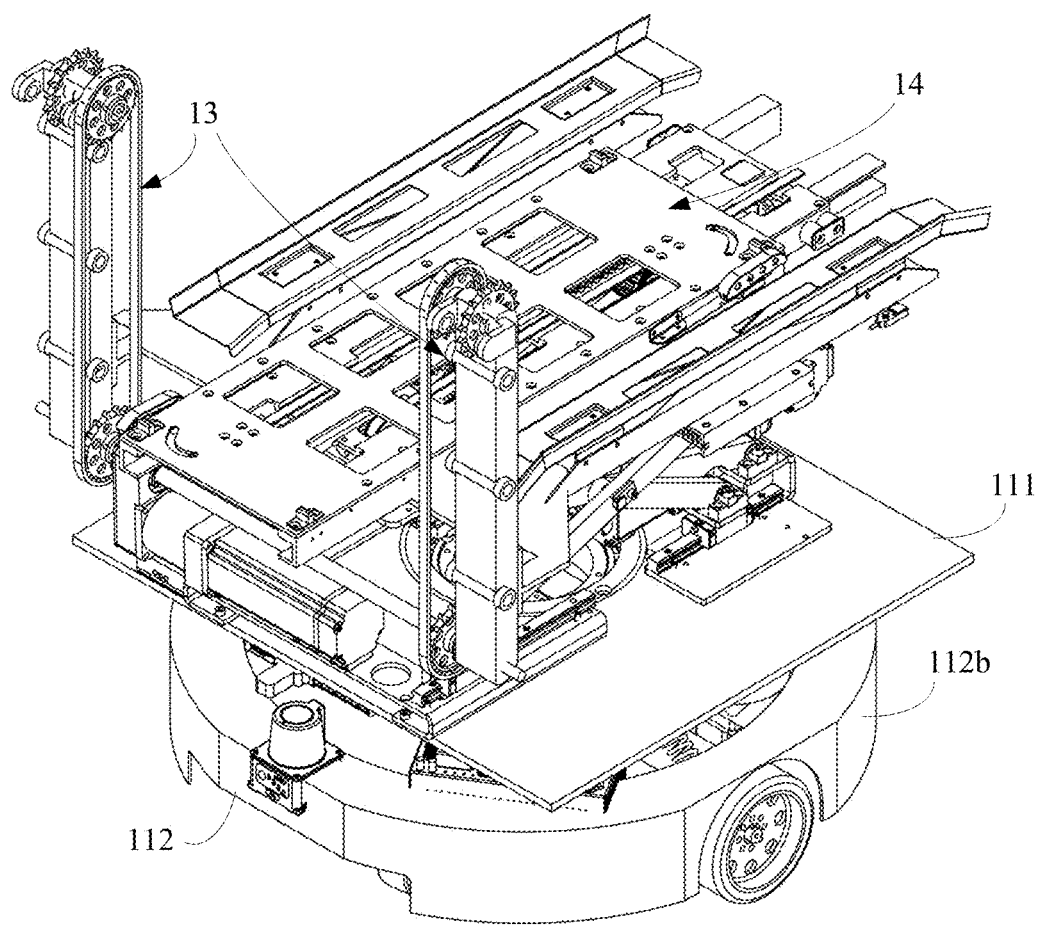
FIG. 12 is a schematic structural diagram of a transport robot according to an embodiment of the present disclosure (with a part of a chassis housing shown)

FIG. 12 is a schematic structural diagram of a transport robot 1 according to an embodiment of the present disclosure (with a part of a chassis housing 112b shown). Referring to FIG. 2 and FIG. 12 together, in a specific implementation, the body 11 includes a turntable 111, a chassis assembly 112, a second driver 15, and a third driver 16. The turntable 111 is rotatably connected to the chassis assembly 112, and the lifting assembly 12 is arranged on the turntable 111. The second driver 15 is connected to the turntable 111, and is configured to control the turntable 111 to rotate relative to the chassis assembly 112. The chassis assembly 112 is provided with a walking wheel assembly 112a. The third driver 16 is connected to the walking wheel assembly 112a, and is configured to control the walking wheel assembly 112a to go straight or steer, and drive the chassis assembly 112 to move straight or rotate.

The turntable 111 is located above the chassis assembly 112. The turntable 111 can support the lifting assembly 12 and drive the lifting assembly 12 to rotate synchronously. The chassis assembly 112 may be integrated with a plurality of devices (e.g., a power source, a controller, and electric circuits), and can further support a plurality of structures located above the chassis assembly 112, for example, the turntable 111, the lifting assembly 12, the first climbing assembly 13 and the like. The walking wheel assembly 112a is arranged at a bottom of the chassis assembly 112, and the transport robot 1 as a whole can go straight or steer on the ground by using the walking wheel assembly 112a.

When the second driver 15 is activated, the second driver 15 may control the turntable 111 to rotate independently relative to the chassis assembly 112. When the third driver 16 is activated, the third driver 16 may control the walking wheel assembly 112a to go straight or steer, to drive the chassis assembly 112 to go straight or rotate relative to the ground. When the chassis assembly 112 moves, the chassis assembly 112 may drive devices and structures (e.g., the turntable 111, the lifting assembly 12, the first climbing assembly 13) above the chassis assembly 112 to move synchronously. Certainly, when both the second driver 15 and the third driver 16 are activated, both the turntable 111 and the chassis assembly 112 can move independently. That is, the chassis assembly 112 can move relative to the ground. The turntable 111 can move with the chassis assembly 112, and can also rotate relative to the chassis assembly 112.

In a case that the container 3 positioned above the turntable 111 has a large size, for example, when the container 3 is a cuboid, the container 3 has a long side and a wide side. When a size of the long side is greater than a maximum contour size of the chassis assembly 112, an edge part of the container 3 protrudes from an edge of the chassis assembly 112. When the transport robot 1 needs to steer, the third driver 16 may control the walking wheel assembly 112a to steer, thereby driving the chassis assembly 112 to rotate relative to the ground, to adjust a traveling direction. In this case, if the turntable 111 does not rotate relative to the chassis assembly 112, the chassis assembly 112 drives the turntable 111 to rotate synchronously, to further drive the container 3 to rotate synchronously. Because the container 3 is generally cuboid, the container 3 occupies larger steering space during rotation with the chassis assembly 112, which is easy to cause interference and collision with an object in a surrounding environment.

Therefore, in this embodiment, during rotation of the chassis assembly 112 controlled by the third driver 16, the second driver 15 may also control the turntable 111 to rotate in an opposite direction relative to the chassis assembly 112 by the same angle, that is, a rotation direction of the turntable 111 is opposite to a rotation direction of the chassis assembly 112. In this way, the traveling direction of the chassis assembly 112 may be adjusted relative to the ground, and the turntable 111 and the ground may be kept static relative to each other. Therefore, when the traveling direction of the transport robot 1 is adjusted, the container 3 does not rotate accordingly, thereby avoiding interference caused by large space occupied during rotation of the container 3.

For ease of assembly and control, both the second driver 15 and the third driver 16 may be electric motors.

Specifically, referring to FIG. 2 and FIG. 12, a shape of a projection of the chassis assembly 112 in the horizontal direction may be circular or approximately circular, that is, a shape of an outer contour of the chassis assembly 112 is circular or approximately circular. The projection of the chassis assembly 112 in a horizontal plane has a substantially circular shape. Therefore, during rotation of the chassis assembly 112, space around the chassis assembly 112 is not additionally occupied, thereby avoiding interference during rotation. In this embodiment, the chassis assembly 112 includes a chassis housing 112b. The chassis housing 112b is an outermost structural member of the chassis assembly 112. Devices in the chassis assembly 112 may be arranged in the chassis housing 112b. A contour shape of the chassis housing 112b is circular, thereby preventing the chassis assembly 112 from increasing occupied external space during rotation.

In some embodiments, the turntable 111 may be omitted, and the lifting assembly 12 may be mounted to the chassis assembly 112. For example, the walking wheel assembly 112a may be controlled to rotated by 90 degrees, however, the chassis assembly 112 (transport robot 1 or fork assembly 14) is retained static relative to the ground during rotation of the walking wheel assembly 112a. During rotation of the walking wheel assembly 112a, the orientation (heading) of the transport robot 1 is not changed, and thus the orientation of the container 3 transported by transport robot 1 is also unchanged. After the walking wheel assembly 112a is rotated by 90 degrees, the transport robot 1 may move in a new direction without rotating the container 3 transported by the transport robot 1. This new direction may be perpendicular to the previous travelling direction. In this way, the container 3 will not rotate (e.g., the container 3 keeps static relative to the ground) during the process that the walking wheel assembly 112a rotates, and the container 3 will move with the transport robot 1 in the new travelling direction without changing the orientation of the container 3. When the transport robot 1 is under the rack, the transport robot 1 can change its traveling direction in the same way, however, the orientation of the container temporarily stored in the fork assembly 14 of the transport robot 1 is unchanged relative to the ground.

Figure 13:
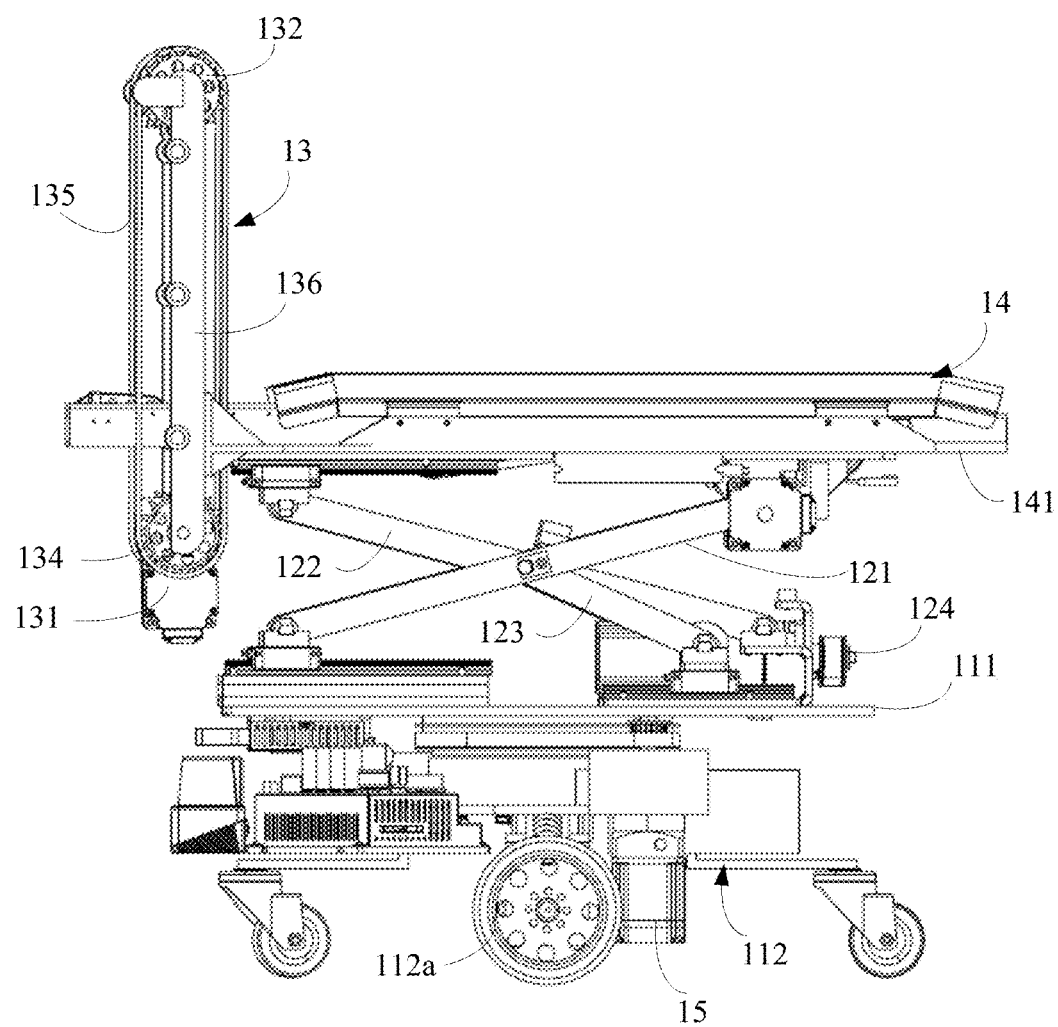
FIG. 13 is a side view of a transport robot according to an embodiment of the present disclosure (with an exterior decoration member of a housing removed)

In a specific implementation, referring to FIG. 13, the transport robot 1 further includes a fork assembly 14. The fork assembly 14 is configured to retrieve or place materials (e.g., goods, articles, items, or components). The fork assembly 14 includes a base 141. The base 141 may be configured to temporarily store the materials. The base 141 is arranged on the lifting assembly 12. During operation, the lifting assembly 12 may drive the fork assembly 14 to ascend and descend, thereby facilitating adjustment of a height of the fork assembly 14 for retrieving or placing goods. The first climbing assembly 13 is connected to the fork assembly 14 or the lifting assembly 12.

In some embodiments, as shown in FIG. 2, the fork assembly 14 includes a telescopic fork 142 and two pairs of projections 143. The projections 143 may be vertically arranged on an upper side of the telescopic fork 142. Each of the projections 143 may be fixedly connected to the telescopic fork 142. However, in an embodiment, each of the projections 143 may be foldably connected to the telescopic fork 142. For example, during the process that the telescopic fork 142 slides underneath the target storage location, the projections 143 are folded so that the projections 143 are arranged in a horizontal direction that is in parallel to the upper surface of the telescopic fork 142. After the telescopic fork 142 is fully located under the target storage location, the projections 143 are unfolded so that the projections 143 are vertically arranged. When the projections 143 are vertically arranged, the telescopic fork 142 is ready for retrieval of containers 3.

In a specific implementation, FIG. 13 is a side view of the transport robot 1 according to an embodiment of the present disclosure (with an exterior decoration member of a housing removed). Referring to FIG. 13, the lifting assembly 12 includes a scissor-cross rod structure and a fourth driver 124. The fourth driver 124 is connected to the scissor-cross rod structure and is configured to drive the scissor-cross rod structure to ascend and descend.

For example, the scissor-cross rod structure includes a driving rod 123, a first connecting rod 121, and a second connecting rod 122. A middle portion of the first connecting rod 121 is rotatably connected to a middle portion of the second connecting rod 122. An end of the first connecting rod 121 is rotatably connected to the base 141 of the fork assembly 14, and the other end of the first connecting rod 121 is slidably connected to the body 11. An end of the second connecting rod 122 is slidably connected to the base 141, and the other end of the second connecting rod 122 is rotatably connected to the body 11. An end of the driving rod 123 is slidably connected to the body 11, and the other end of the driving rod 123 is rotatably connected to middle portions of the first connecting rod 121 and the second connecting rod 122. The fourth driver 124 is connected to the driving rod 123, and is configured to control the end of the driving rod 123 connected to the body 11 to slide in a direction perpendicular to a lifting direction of the lifting assembly 12. In this embodiment, the direction perpendicular to the lifting direction of the lifting assembly 12 is the horizontal direction.

The middle portion of the first connecting rod 121, the middle portion of the second connecting rod 122, and the driving rod 123 may be rotatably connected through a pin shaft. When the fourth driver 124 controls the end of the driving rod 123 connected to the body 11 to move in the horizontal direction, the end of the driving rod 123 connected to the first connecting rod 121 and the second connecting rod 122 can drive the middle portions of the first connecting rod 121 and the second connecting rod 122 to move upward or downward, so that an end of the first connecting rod 121 can slide relative to the body 11, another end of the first connecting rod 121 rotates relative to the base 141, and an end of the second connecting rod 122 can slide relative to the base 141, and another end of the second connecting rod 122 rotates relative to the body 11. Therefore, a lifting function of the lifting assembly 12 could be implemented, and further the fork assembly 14 and the first climbing assembly 13 could be driven to ascend and descend. For ease of assembly and control, the fourth driver 124 may be a motor.

An embodiment of the present disclosure further provides a rack 2. Referring to FIG. 1, a second climbing assembly 21 is arranged on the rack 2. The second climbing assembly 21 is configured to fit with the first climbing assembly 13 of the transport robot 1, so that the transport robot 1 could climb on the rack 2 in the vertical direction.

As described above, when the transport robot 1 needs to retrieve or place the container 3 at a storage location 203 at a certain height of the rack 2, the transport robot 1 may walk on the ground to be below the target storage location, and the second climbing assembly 21 on the rack 2 is located above the transport robot 1 and can be aligned with the first climbing assembly 13 in the vertical direction. That is, the transport robot 1 walks to a position under the second climbing assembly 21 of the rack 2 and aligns the first climbing assembly 13 with the second climbing assembly 21 in the vertical direction. Then, the lifting assembly 12 may be controlled to drive the first climbing assembly 13 to ascend, so that the first climbing assembly 13 is docked with the second climbing assembly 21. After the first climbing assembly 13 and the second climbing assembly 21 are docked, the first climbing assembly 13 may be controlled to move, so that the first climbing assembly 13 can climb upward along the second climbing assembly 21 and move to the target storage location to retrieve or place the container 3.

Therefore, according to the rack 2 provided in this embodiment, docking in midair between the transport robot 1 and the rack 2 can be implemented, so that space at the bottom of the rack 2 can be released, to facilitate the transport robot 1 to walk under the bottom of the rack 2. In this way, a walking distance of the transport robot 1 between the two sides of the rack 2 could be shorten, and carrying efficiency of the transport robot 1 could be improved.

In a specific implementation, the second climbing assembly 21 includes a second engaging mechanism, and the second engaging mechanism is configured to be engaged with the first engaging mechanism of the transport robot 1, so that the transport robot 1 can climb on the rack 2 in the vertical direction.

The second engaging mechanism may have a plurality of structural forms. For example, referring to FIG. 11, the rack 2 includes the longitudinal beam 23, and the second engaging mechanism is the chain 212. The chain 212 may be directly or indirectly connected to the longitudinal beam 23, and the chain 212 is configured to fit with the chain wheel 132 of the first climbing assembly 13, so that the transport robot 1 climbs on the chain 212.

Through fitting between the chain 212 and the chain wheel 132, stability of climbing of the transport robot 1 on the rack 2 can be ensured, assembly and maintenance of the chain 212 and the chain wheel 132 could be facilitated, and costs could be reduced.

Certainly, in some other embodiments, the second engaging mechanism may not be the chain 212. For example, the second engaging mechanism includes a toothed rack. The climbing of the transport robot 1 may also be implemented by fitting between the toothed rack and the chain wheel 132. In some embodiments, the second engaging mechanism may also include grooves or projections provided on the mounting base 211, and the first engaging mechanism includes the synchronous belt 130.

In a specific implementation, referring to FIG. 11 together with FIG. 18, the second climbing assembly 21 further includes a mounting base 211. As described above, the mounting base 211 is connected to the longitudinal beam 23. The second engaging mechanism is connected to the mounting base 211. The mounting base 211 and the second engaging mechanism have a specific length, could extend along the longitudinal beam 23, and could cover each storage location 203 in the height direction of the rack 2, so that the transport robot 1 can climb and reach each storage location 203 in the height direction of the rack 2 for retrieving or placing goods.

In a specific implementation, referring to FIG. 11 and FIG. 18, the mounting base 211 may define a groove 2111. The second engaging mechanism may be arranged in the groove 2111, so that the second engaging mechanism can be protected by the groove 2111.

In an embodiment, referring to FIG. 11, for example, the second engaging mechanism is the chain 212. In the horizontal direction, a side provided with an opening of the groove 2111 faces an outer side of the rack 2, that is, faces the aisle, so that the chain 212 could fit with the chain wheel 132 of the transport robot 1. The groove 2111 has a side wall 2113, and an end surface of the side wall 2113 of the groove 2111 is configured to come into contact with the first roller 137 of the first climbing assembly 13. The end surface of the side wall of the groove 2111 is the first surface 2111a described above. The first surface 2111a faces away the rack 2 (e.g., the first surface 2111a faces an aisle formed by racks 2). After the chain wheel 132 of the first climbing assembly 13 is engaged with the chain 212, the first roller 137 may abut against the end surface of the side wall of the groove 2111. During climbing of the transport robot 1, the first roller 137 can roll on the end surface of the groove 2111, thereby ensuring climbing stability of the transport robot 1.

In an embodiment, referring to FIG. 11, a guide rib 2112 may be provided on an outer side wall of the mounting base 211, that is, an outer side of the side wall 2113 of the groove 2111. The guide rib 2112 extends in the vertical direction. The guide rib 2112 protrudes from an outer surface of the outer side wall, so that a surface of a side of the guide rib 2112 that is away from the transport robot 1 is formed as the second surface 2112a described above. The second surface 2112a faces the rack 2 (e.g., the second surface 2112a does not face the aisle formed by racks 2, and orientates inside the rack 2). The second surface 2112a is configured to come into contact with the second roller 138 in the first climbing assembly 13. During climbing of the transport robot 1, the second roller 138 can roll on the second surface 2112a of the guide rib 2112, thereby ensuring climbing stability of the transport robot 1.

In some embodiments, the guide rib 2112 may be omitted. Both the second surface 2112a and the first surface 2111a may be directly provided on the wing 2115 of the side wall 2113.

Only one of the first roller 137 and the second roller 138 may be arranged, or both may be arranged. In a preferred embodiment, both the first roller 137 and the second roller 138 may be used. A direction of an acting force of the first roller 137 on the first surface 2111a is opposite to a direction of an acting force of the second roller 138 on the second surface 2112a, so that some parts on the second climbing assembly 21 can be clamped between the first roller 137 and the second roller 138, thereby preventing the transport robot 1 from shaking during climbing, and improving climbing reliability and stability.

In an embodiment, the second roller 138 is provided and the first roller 137 is not provided. The second roller 138 is in rolling contact with the second surface 2112a, and the chain wheel 132 is engaged with the toothed rack or chain 212.

Figure 19:
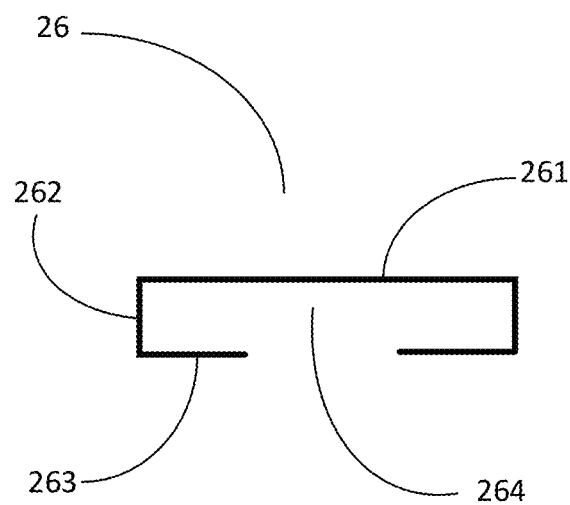
FIG. 19 is a schematic structural diagram of the cross section of another mounting base in the second climbing assembly according to an embodiment of the present disclosure.

In an embodiment, the first roller 137 is provided and the second roller 138 is not provided. Another mounting base 26 is provided. The mounting base 26 is mounted to the longitudinal beam 23. As shown in FIG. 19, the mounting base 26 of the second climbing assembly 21 includes a base wall 261, a side wall 262 and a wing 263. The wing 263 is substantially perpendicular to the side wall 262. A groove 264 is formed by the base wall 261, the side wall 262 and the wing 263. An inner side of the wing 263 faces the groove 264. The toothed rack or chain 212 is mounted in the groove 264. Specially, the toothed rack or chain 212 may be mounted on the base wall 261. The chain wheel 123 engages with the toothed rack or chain 212 within the groove 264. The first roller 137 may be in rolling contact with both the base wall 261 and the wing 263. The first roller 137 may be also only in rolling contact with the wing 263. For example, the first roller 137 is in rolling contact with the inner side of the wing 263. In this way, the transport robot 1 may stably climb up and down on the rack 2 after the chain wheel 123 is aligned with the toothed rack or chain 212.

In an embodiment, referring to FIG. 1, a channel 22 for the transport robot 1 to walk could be provided at the bottom of the rack 2, and the second climbing assembly 21 is located above the channel 22. Docking in the midair between the transport robot 1 and the rack 2 can be implemented by arranging the second climbing assembly 21 above the channel 22, so that space at the bottom of the rack 2 can be released, and the channel 22 can be arranged at the bottom of the rack 2. In this way, the transport robot 1 can walk in the channel 22, thereby shortening a walking distance of the transport robot 1 between the two sides of the rack 2 and improving carrying efficiency.

Specifically, in some embodiments, the rack 2 may include a rack body 20 and the second climbing assembly 21. The rack body 20 is configured to store a material (e.g., goods, components, or articles). The second assembly 21 is arranged on the rack body 20. The rack body 20 defines the channel 22 at the bottom of the rack body 20, and the transport robot 1 with or without a container 3 can pass through the channel 22, as shown in FIGS. 1, 9 and 14-15. The second climbing assembly 21 extends in the vertical direction. A bottom end 213 of the second climbing assembly 21 has a height equal to or greater than a height of the channel 22. In this way, the second climbing assembly 21 will not obstruct the transport robot 1 from passing through the channel 22.

In a specific implementation, referring to FIG. 1, a plurality of support columns 25 are further arranged at a bottom of the rack 2. The channel 22 is formed between the support columns 25, and a distance between two adjacent support columns 25 is greater than a maximum length dimension of the transport robot 1 in a horizontal direction.

The support column 25 can support an entire rack 2. The support column 25 may be a structure independently welded to the transverse beam 24 or the longitudinal beam 23, or may be a part of the longitudinal beam 23. As shown in FIG. 1, each support column 25 is connected to a corresponding longitudinal beam 23. Each support column 25 and the corresponding longitudinal beam 23 may also be integrally formed into one peace. Because climbing of the transport robot 1 on the rack 2 may be implemented by using docking in the midair, a distance between the support columns 25 at the bottom of the rack 2 may be widened, that is, the distance between two adjacent support columns 25 may be greater than a length of the transport robot 1. A specific design may be that the support columns 25 are spaced apart in an extending direction perpendicular to the longitudinal beam 23, so that space at the bottom of the rack 2 can form the channel 22 for the transport robot 1 to pass through. In this way, a walking distance of the robot between the two sides of the rack 2 could be shorten, and goods transferring efficiency of the transport robot 1 could be improved.

Specifically, in some embodiments, the rack body 20 may include a storage body 201 and the plurality of support columns 25. The plurality of support columns 25 are arranged at a bottom of the storage body 201. The storage body 201 defines the plurality of storage locations 203 for storing materials or containers 3. Specifically, the storage body 201 includes the plurality of longitudinal beams 23 and the plurality of transverse beams 24 that are cross-connected to form the plurality of storage locations 203. The plurality of support columns 25 are configured to support the storage body 201. The plurality of support columns 25 are spaced apart in a horizontal direction. The channel 22 is formed between adjacent support columns 25. A distance between the adjacent two support columns 25 is greater than a width or a length of the transport robot 1, such that the transport robot 1 could pass through the channel under the rack.

In an embodiment, a plurality of second climbing assemblies 21 are arranged on the storage body 201. Specifically, each second climbing assembly 21 is connected to the longitudinal beams 23. A distance between adjacent second climbing assemblies 21 is less than the width of the transport robot 1 to allow the transport robot 1 to fit with the adjacent second climbing assemblies 21, such that the transport robot 1 is capable of climbing along the adjacent second climbing assemblies 21. Each second climbing assembly 21 is located within the storage body 201, to allow the transport robot 1 to pass between the adjacent support columns 25. In other words, the bottom end 213 of each second climbing assembly 21 is located within the storage body 201, or the bottom end 213 of each second climbing assembly 21 does not extend beyond the storage body 201, such that the second climbing assembly 21 will not obstruct the transport robot 1 from passing between adjacent support columns 25.

Figure 14:
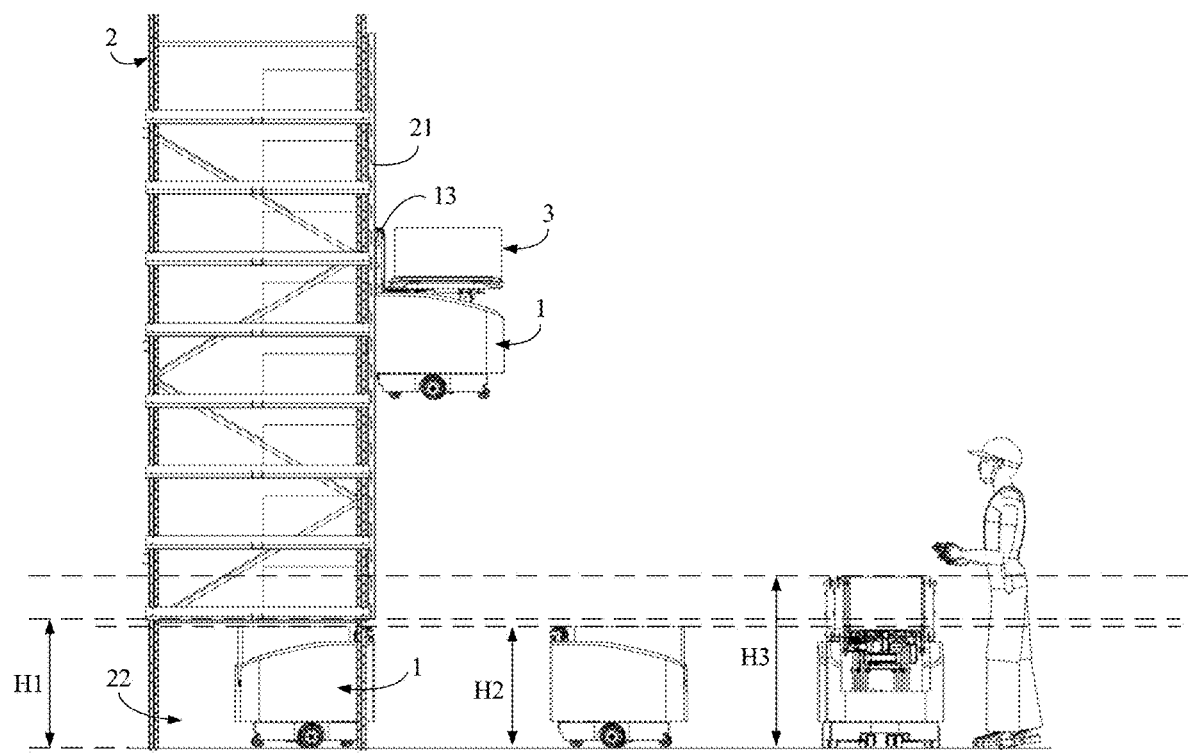
FIG. 14 is a side view of a warehousing system according to an embodiment of the present disclosure.
Figure 15:
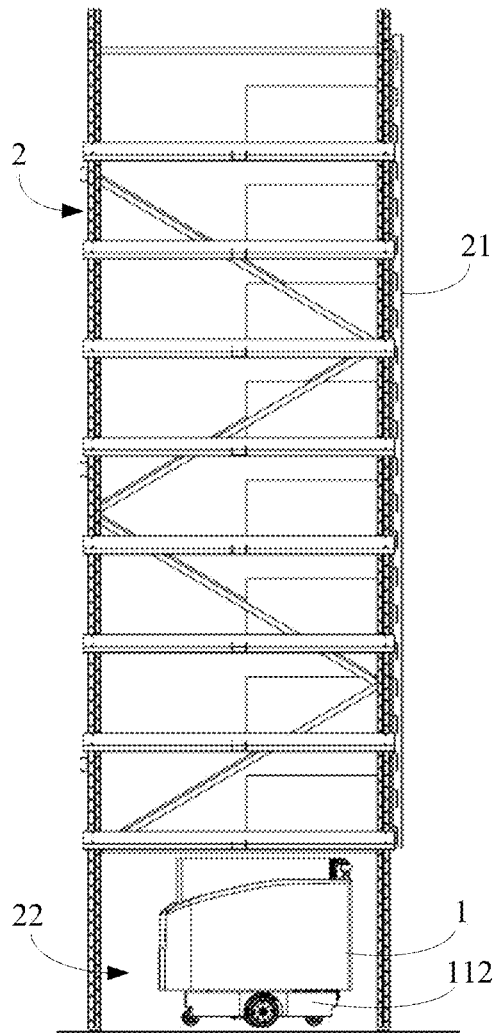
FIG. 15 is a schematic diagram of a transport robot walking in a channel at a bottom of a rack.

FIG. 14 is a side view of a warehousing system according to an embodiment of the present disclosure. FIG. 15 is a schematic diagram of a transport robot 1 walking in the channel 22 at a bottom of the rack 2. Referring to FIG. 14, a height H1 of the channel 22 is greater than a height H2 of the transport robot 1 before the lifting assembly 12 is lifted, to allow the transport robot 1 to move under the bottom end 213 of the second climbing assembly 21. In an embodiment, the height H1 of the channel 22 may be the height of the bottom end 213 of the second climbing assembly 21. Referring to FIG. 15, it can be ensured that when the transport robot 1 walks in the channel 22, interference between a top of the transport robot 1 and the rack 2 above the channel 22 is avoided. In addition, referring to FIG. 14, the height H1 of the channel 22 is less than a maximum height H3 of the transport robot 1 after the lifting assembly 12 is lifted, to allow the transport robot 1 to fit with the second climbing assembly 21. After the lifting assembly 12 is lifted, the height of the bottom end 213 of the second climbing assembly 21 is also less than the maximum height H3 of the transport robot 1. Therefore, when the transport robot 1 has a climbing requirement, the first climbing assembly 13 may be raised to the maximum height by using the lifting assembly 12. In this case, a height between a top end of the first climbing assembly 13 and the ground is the maximum height H3 of the transport robot 1. When the maximum height H3 is greater than the height H1 of the channel 22, effective docking in the midair between the first climbing assembly 13 and the second climbing assembly 21 can be implemented, so that the transport robot 1 could climb along the rack 2. In addition, when the lifting assembly 12 is raised to a position of the maximum height H3, a human or a robot at a work station may directly pick ordered goods or articles from a material container 3 transported by the transport robot 1 into an order container transported by another transport robot 1 so that sorting efficiency can be improved. In this case, it is not necessary to provide a table to accommodate the material container 3 or the order container.

As shown in FIGS. 14-15, the transport robot 1 may pass through the channel 22 under the rack 2 when the transport robot 1 is transporting a container 3. In an embodiment, the transport robot 1 may travel across the racks in a direction perpendicular to aisles formed by the racks and then moves in an aisle to align with the second climbing assembly 21. After the transport robot 1 is aligned with the second climbing assembly 21 on the rack 2, the transport robot 1 climbs up on the rack to a target storage location, and retrieves a container 3 from the target storage location. Then the transport robot 1 climbs down on the rack and returns back to the ground. The transport robot 1 then moves in a direction perpendicular to the aisle and travels under the rack. When the transport robot 1 is under the rack, the transport robot 1 may change its traveling direction without changing the orientation (heading) of the fork assembly 14 and the container 3. The container 3 transported by the transport robot 1 may move in different traveling directions with a constant orientation (heading).

In an embodiment, when a material container 3 is fully picked (e.g., all ordered articles in the material container are already picked into the order container), the transport robot 1 may return the material container to a storage location 203 in the rack 2. The transport robot 1 may return the material container to the same storage location 203 as the storage location 203 where the material container previously stored. However, the transport robot 1 may also return the material container to a different storage location 203 from the storage location 203 where the material container previously stored.

In an embodiment, when an order container is not fully picked (e.g., some ordered articles are not picked into the order container), the transport robot 1 may transport the order container to the rack 2 for temporary storage. Preferably, the transport robot 1 may transport the order container to the lowest storage location 203 in the rack 2 for temporary storage. When the order container is fully picked (e.g., all ordered articles have been picked into the order container), the transport robot 1 may transport the order container to a package station for shipment. In an embodiment, there may be two kinds of robots. The robot configured to transport the order container is different from the robot configured to transport the material container.

It should be noted that the material container is a container for containing goods or articles stored in the rack 2 within a facility (e.g., a warehouse). The order container is a container for containing picked ordered goods or articles.

An embodiment of the present disclosure further provides a warehousing system. Referring to FIG. 1, the warehousing system includes the transport robot 1 and the rack 2 provided in any embodiment of the present disclosure. The transport robot 1 climbs in a vertical direction on the rack 2 through fitting between the first climbing assembly 13 of the transport robot 1 and the second climbing assembly 21 on the rack 2. The docking and climbing manners between the transport robot 1 and the rack 2 are the same as those described above, and details are not described herein again.

Figure 16:
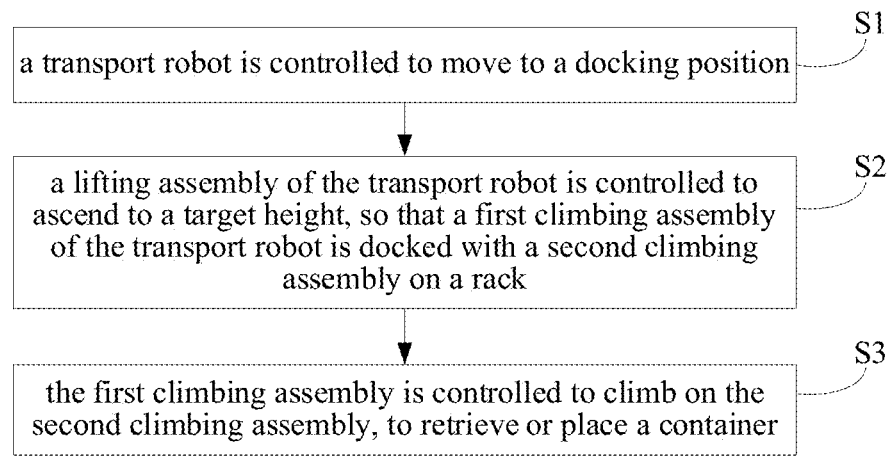
FIG. 16 is a flowchart of a docking method according to an embodiment of the present disclosure.

FIG. 16 is a flowchart of a docking method according to an embodiment of the present disclosure. Referring to FIG. 16, an embodiment of the present disclosure further provides a docking method between a transport robot 1 and a rack 2. The docking method may be applied to the warehousing system provided in any embodiment of the present disclosure described above. The docking method includes the following operations.

In block S1: a transport robot 1 is controlled to move to a docking position.

In the warehousing system, the transport robot 1 may retrieve the container 3 including a bin, a box, a carton, a pallet, load materials, or a package, and the like at different ground positions. Movement of the transport robot 1 between different positions may be controlled by instructions sent by a terminal control system (e.g., a server with a processor and a memory), and may also be accurately positioned in cooperation with assistance of sensors, bar codes, QR codes, and the like at each position. For example, when the transport robot 1 needs to place the container 3 at the target storage location on the rack 2, the transport robot 1 may first walk towards the docking position, and further cause the transport robot 1 to walk to a position below the target storage location through a sensor, a bar code, a QR code, and the like, and then cause the first climbing assembly 13 of the transport robot 1 to be aligned with a corresponding second climbing assembly 21 on the rack 2 in the vertical direction through a fine adjustment.

In block S2: a lifting assembly 12 of the transport robot 1 is controlled to ascend to a target height, so that a first climbing assembly 13 of the transport robot 1 is docked with a second climbing assembly 21 on a rack 2.

After the first climbing assembly 13 and the second climbing assembly 21 are aligned, the first climbing assembly 13 may be ascended to the target height by using the lifting assembly 12, so that the first climbing assembly 13 can be docked with a corresponding second climbing assembly 21 above.

In block S3: the first climbing assembly 13 is controlled to climb on the second climbing assembly 21, to retrieve or place a container 3.

After the first climbing assembly 13 and the second climbing assembly 21 are docked, the first climbing assembly 13 may be controlled to climb on the second climbing assembly 21 in the vertical direction, to reach the target position, so that the transport robot 1 is ascended to the target storage location for retrieving or placing goods.

Therefore, according to the docking method provided in this embodiment of the present disclosure, the docking in the midair between the transport robot 1 and the rack 2 can be implemented, so that space at the bottom of the rack 2 can be released, and the channel 22 can be formed at the bottom of the rack 2. In this way, the transport robot 1 can walk in the channel 22, thereby shortening a walking distance of the transport robot 1 between the two sides of the rack 2 and improving carrying efficiency.

In some embodiments, a transport robot includes a body, a lifting assembly arranged on the body and first climbing assembly arranged on the lifting assembly and located on a side of the body in a horizontal direction. The first climbing assembly is configured to ascend and descend under driving of the lifting assembly, so as to be docked with a second climbing assembly on a rack in a vertical direction, and be capable of climbing on the rack in the vertical direction.

In some embodiments, the first climbing assembly includes a first driver, a transmission mechanism, and a first engaging mechanism, two ends of the transmission mechanism are respectively in transmission connection with the first driver and the first engaging mechanism, the first driver is configured to control the first engaging mechanism to move through the transmission mechanism, and the first engaging mechanism chain wheel is configured to be engaged with the second climbing assembly.

In some embodiments, the first engaging mechanism includes a chain wheel, and the chain wheel is configured to be engaged with the second climbing assembly.

In some embodiments, the first engaging mechanism includes a synchronous belt, a plurality of protrusions are arranged on the synchronous belt, and the synchronous belt is configured to be engaged with the second climbing assembly through the plurality of protrusions.

In some embodiments, the transmission mechanism includes a first driven wheel, a second driven wheel, and a transmission belt, the first driven wheel is coaxially connected to a driving shaft of the first driver, the second driven wheel is coaxially connected to the chain wheel, and the first driven wheel and the second driven wheel are in transmission connection through the transmission belt.

In some embodiments, the first climbing assembly further includes a support arm, and the chain wheel is rotatably arranged at an end of the support arm away from the body.

In some embodiments, a first roller is arranged on the support arm, a first surface is arranged on a side of the second climbing assembly facing towards a side that fits with the first climbing assembly, and the first roller is configured to be in rolling contact with the first surface; and/or a second roller is arranged on the support arm, a second surface is arranged on a side of the second climbing assembly facing away from the side that fits with the first climbing assembly, and the second roller is configured to be in rolling contact with the second surface.

In some embodiments, the body includes a turntable, a chassis assembly, a second driver, and a third driver. The turntable is rotatably connected to the chassis assembly, and the lifting assembly is arranged on the turntable. The second driver is connected to the turntable, and is configured to control the turntable to rotate relative to the chassis assembly. The chassis assembly is provided with a walking wheel assembly, and the third driver is connected to the walking wheel assembly, and is configured to control the walking wheel assembly to go straight or steer, and drive the chassis assembly to rotate.

In some embodiments, a shape of a projection of the chassis assembly in the horizontal direction is circular.

In some embodiments, the transport robot further includes a fork assembly, the fork assembly is configured to retrieve or place a material, the fork assembly includes a base, the base is configured to temporarily store the material, and the base is arranged on the lifting assembly.

In some embodiments, the lifting assembly includes a scissor-cross rod structure and a fourth driver, and the fourth driver is connected to the scissor-cross rod structure and is configured to drive the scissor-cross rod structure to ascend or descend.

In some embodiments, the scissor-cross rod structure includes a driving rod, a first connecting rod, and a second connecting rod, and a middle portion of the first connecting rod is rotatably connected to a middle portion of the second connecting rod. An end of the first connecting rod is rotatably connected to the base, and the other end of the first connecting rod is slidably connected to the body. An end of the second connecting rod is slidably connected to the base, and the other end of the second connecting rod is rotatably connected to the body. An end of the driving rod is slidably connected to the body, and the other end of the driving rod is rotatably connected to middle portions of the first connecting rod and the second connecting rod. The fourth driver is connected to the driving rod, and is configured to control an end of the driving rod connected to the body to slide in a direction perpendicular to a lifting direction of the lifting assembly.

In some embodiments, a rack is further provided, where a second climbing assembly is arranged on the rack, and the second climbing assembly is configured to fit with the first climbing assembly in the transport robot provided in the first aspect of this application, so that the transport robot is capable of climbing on the rack in a vertical direction.

In some embodiments, the second climbing assembly includes a second engaging mechanism, and the second engaging mechanism is configured to be engaged with the first engaging mechanism of the transport robot, so that the transport robot is capable of climbing on the rack in the vertical direction.

In some embodiments, the rack includes a longitudinal beam, the second climbing assembly further includes a mounting base, the mounting base is connected to the longitudinal beam, and the second engaging mechanism is connected to the mounting base.

In some embodiments, a groove is provided on the mounting base, the second engaging mechanism is arranged in the groove, and in a horizontal direction, an end surface of a side wall of the groove is configured to come into contact with a first roller of the first climbing assembly; and/or a guide rib is provided on an outer side wall of the mounting base, the guide rib extends in the vertical direction, and a surface of a side of the guide rib facing away from the transport robot is configured to come into contact with the second roller of the first climbing assembly.

In some embodiments, a channel for the transport robot to walk is arranged at a bottom of the rack, and the second climbing assembly is located above the channel.

In some embodiments, a plurality of support columns are further arranged at a bottom of the rack, the channel is formed between the support columns, and a distance between two adjacent support columns is greater than a maximum length dimension of the transport robot in a horizontal direction.

In some embodiments, a height of the channel is greater than a height of the transport robot before the lifting assembly is lifted, and the height of the channel is less than a maximum height of the transport robot after the lifting assembly is lifted.

In some embodiments, a warehousing system is further provided, including the transport robot provided in the first aspect of this application and the rack provided in the second aspect of this application. The transport robot is configured to climb on the rack in the vertical direction through fitting between the first climbing assembly and the second climbing assembly on the rack.

In some embodiments, a docking method is further provided, which is applied to the warehousing system provided in the third aspect of this application. The method includes the following steps: controlling a transport robot to move to a docking position; controlling a lifting assembly of the transport robot to ascend to a target height, so that a first climbing assembly of the transport robot is docked with a second climbing assembly on a rack; and controlling the first climbing assembly to climb on the second climbing assembly in a vertical direction to reach a target position for retrieving or placing a container.

The technical solutions provided in this application may achieve the following beneficial effects: according to the transport robot, the rack, the warehousing system, and the docking method provided in this application, docking in midair between the transport robot and the rack can be implemented, so that space at a bottom of the rack can be released, and the channel can be arranged at the bottom of the rack. In this way, the transport robot can walk in the channel, thereby shortening a walking distance of the transport robot between two sides of the rack and improving carrying efficiency.

The foregoing docking method may be controlled and implemented by a computer device. The computer device includes a memory and a processor, where the memory stores a computer program, and the processor, when executing the computer program, implements the steps of the foregoing docking method according to the present disclosure. The memory includes any medium that can store program code, such as a USB flash drive, a removable hard disk, a read-only memory (ROM), a random access memory (RAM), a magnetic disk, or an optical disc.

It should be noted that the transport robot 1 also include a controller (computer device) containing a processor and a memory. The controller of the transport robot 1 is not shown in drawings, however, the controller may be located in the chassis housing 112b. The controller of the transport robot 1 can control various components of the transport robot 1 to implement corresponding functions. In an embodiment, the above docking method indicated by FIG. 16 can be performed by the controller of the transport robot 1. In some embodiments, the above docking method indicated by FIG. 16 can be performed by a server having the computer device.

Figure 20:
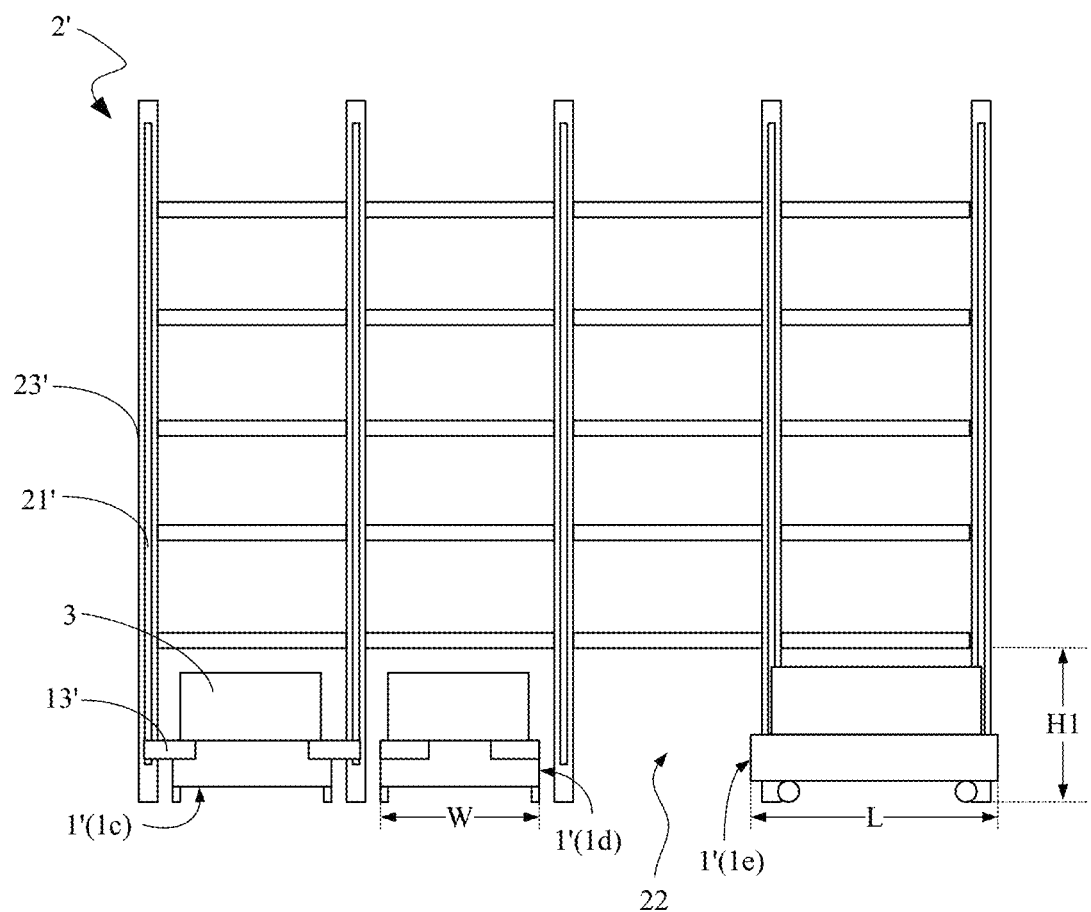
FIG. 20 is a schematic structural diagram of another warehousing system according to an embodiment of the present disclosure.

In some other embodiments, the lifting assembly 12 may be omitted. The first climbing assembly 13' (13) and the fork assembly 14 may be mounted to the chassis assembly 112. The first climbing assembly 13' can be extended or retracted along the width side of the transport robot 1'. In order to travel under a rack, the rack 2 is further adjusted and another rack 2' is therefore provided. As shown in FIG. 20, the longitudinal beam 23' extends to the ground and is installed to the ground. The support column 25 therefore can be omitted. The second climbing assembly 21' (21) is still installed to the longitudinal beam 23', however the second climbing assembly 21' extends to a position close to the ground. The distance between adjacent two longitudinal beams 23' in a horizontal direction parallel to the aisle is greater than the width W of the transport robot 1' so that the transport robot 1' can pass through the adjacent two longitudinal beams 23' and then travel under the rack 2' (e.g., the transport robot 1d shown in FIG. 20). However, the distance between two adjacent longitudinal beam 23' may be less or more than the length L of the transport robot 1'. For example, as shown in FIG. 20, the distance between two adjacent longitudinal beam 23' is less than the length L of the transport robot 1e. The channel 22 is formed by the longitudinal beams 23'. The height H1 of the channel 22 is greater than the height of the transport robot 1' especially when the transport robot 1' is in a state where the transport robot 1' is transporting a container 3, so that the transport robot 1' with the container 3 can pass through the channel 22 under the rack 2'. When the transport robot 1' needs to travel under the rack 2', the first climbing assembly 13 returns to a retracted position so that the width of the transport robot 1' is less than the distance between the two adjacent longitudinal beam 23' (e.g., the transport robot 1d shown in FIG. 20). The transport robot 1' with or without a container 3 can travel under the rack 2' in a direction that is perpendicular to the aisle formed by racks 2'. The traveling direction (e.g., a direction of travel) of the transport robot 1' can also change when the transport robot 1' is under the rack 2'. For example, the traveling direction can be changed by 90 degrees, and the transport robot 1' travels under the rack 2' in a direction that is parallel to the aisle. When the transport robot 1' needs to climb on the rack 2', the first climbing assembly 13' extends along the width side of the transport robot 1' to an extended position so that the first climbing assembly 13' is aligned with the second climbing assembly 21' (e.g., the transport robot 1c shown in FIG. 20). After the first climbing assembly 13' is aligned with the second climbing assembly 21', the transport robot 1 climbs upon the rack 2' to retrieve or place a container 3. After the container 3 is retrieved or placed, the transport robot 1 climbs down the rack 2' and returns back to the ground. Then the first climbing assembly 13' is released with the second climbing assembly 21', and the first climbing assembly 13' retracts so as to return to the retracted position. In this way, the transport robot 1' can climb on a rack 2' and travel under the rack 2', however, the lifting assembly 12 is not necessary.

The foregoing descriptions are merely preferred embodiments of the present disclosure, but are not intended to limit the present disclosure. For a person skilled in the art, various modifications and variations may be made to the present disclosure. Any modification, equivalent replacement, or improvement made without departing from the spirit and the principle of the present disclosure shall fall within the protection scope of the present disclosure.

The invention claimed is:

1. A transport robot, comprising:
a body;
a lifting assembly arranged on the body;
a first climbing assembly arranged on the lifting assembly and located on only one side of the body in a horizontal direction;
wherein the lifting assembly is configured to drive the first climbing assembly to ascend or descend relative to the body;
wherein the first climbing assembly is configured to be docked with a second climbing assembly of a rack after being driven to ascend relative to the body, and to climb along the second climbing assembly in a vertical direction.

2. The transport robot according to claim 1, wherein the first climbing assembly comprises a first driver, a transmission mechanism, and a first engaging mechanism;
wherein two ends of the transmission mechanism are respectively in transmission connection with the first driver and the first engaging mechanism;
wherein the first driver is configured to control, through the transmission mechanism, the first engaging mechanism to move; and
wherein the first engaging mechanism is configured to be engaged with the second climbing assembly.

3. The transport robot according to claim 2, wherein the first climbing assembly further comprises a support arm, and the support arm comprises a first end and a second end opposite to the first end;
wherein the first end is connected to the body, the second end is higher than the body; and
wherein the first engaging mechanism is rotatably arranged on the support arm, at least a part of the first engaging mechanism is located at the second end.

4. The transport robot according to claim 3, wherein the first climbing assembly further comprises at least one of:
a first roller arranged on the support arm, the first roller being configured to be in rolling contact with a first surface of the second climbing assembly that faces the body, when the transport robot climbs along the second climbing assembly; and
a second roller arranged on the support arm, the second roller being configured to be in rolling contact with a second surface of the second climbing assembly that faces away from the body, when the first climbing assembly climbs along the second climbing assembly.

5. The transport robot according to claim 2, wherein the first engaging mechanism comprises a synchronous belt and a plurality of protrusions arranged on the synchronous belt, and the plurality of protrusions are configured to be engaged with the second climbing assembly.

6. The transport robot according to claim 2, wherein the first engaging mechanism comprises a chain wheel, and the chain wheel is configured to be engaged with the second climbing assembly.

7. The transport robot according to claim 6, wherein the transmission mechanism comprises:
a first driven wheel coaxially connected to a driving shaft of the first driver;
a second driven wheel coaxially connected to the chain wheel; and
a transmission belt;
wherein the first driven wheel and the second driven wheel are in transmission connection through the transmission belt.

8. The transport robot according to claim 1, wherein the body comprises:
a chassis assembly comprising a walking wheel assembly and a wheel driver connected to the walking wheel assembly, the wheel driver being configured to control the walking wheel assembly to go straight or steer, to drive the chassis assembly to move straight or rotate;
a turntable rotatably connected to the chassis assembly, wherein the lifting assembly is arranged on the turntable; and
a turntable driver connected to the turntable, and configured to control the turntable to rotate relative to the chassis assembly.

9. The transport robot according to claim 8, wherein a projection of the chassis assembly in a horizontal plane is substantially circular.

10. The transport robot according to claim 1, wherein the lifting assembly comprises a scissor-cross rod structure and a rod driver, and the rod driver is connected to the scissor-cross rod structure and is configured to drive the scissor-cross rod structure to ascend or descend.

11. The transport robot according to claim 10, wherein the transport robot further comprises a fork assembly arranged on the lifting assembly, the fork assembly is configured to retrieve or place a material;
wherein the first climbing assembly is connected to the fork assembly;
wherein the scissor-cross rod structure comprises a driving rod, a first connecting rod, and a second connecting rod;
wherein an end of the first connecting rod is rotatably connected to the fork assembly, and the other end of the first connecting rod is slidably connected to the body;
wherein an end of the second connecting rod is slidably connected to the fork assembly, the other end of the second connecting rod is rotatably connected to the body, and a middle portion of the second connecting rod is rotatably connected to a middle portion of the first connecting rod;
wherein an end of the driving rod is slidably connected to the body, and the other end of the driving rod is rotatably connected to middle portions of the first connecting rod and the second connecting rod; and
wherein the rod driver is connected to the driving rod, and is configured to control the end of the driving rod that is connected to the body to slide in a direction perpendicular to a lifting direction of the lifting assembly.

12. A rack, comprising:
a storage body;
a plurality of support columns arranged at a bottom of the storage body, and configured to support the storage body; and
a plurality of second climbing assemblies arranged on the storage body, each second climbing assembly extending along a vertical direction and being configured to fit with a transport robot;
wherein a distance between adjacent second climbing assemblies is less than a width of the transport robot to allow the transport robot to fit with the adjacent second climbing assemblies, such that the transport robot is capable of climbing along the adjacent second climbing assemblies;
wherein a distance between adjacent support columns is greater than the width of the transport robot to allow the transport robot to pass between the adjacent support columns;
wherein a height of a bottom end of the second climbing assembly is greater than a height of the transport robot, so as to allow the transport robot to move under the bottom end of the second climbing assembly.

13. The rack according to claim 12, wherein the storage body comprises a plurality of longitudinal beams, each second climbing assembly comprises a mounting base and a second engaging mechanism;
wherein the mounting base is connected to a longitudinal beam, the mounting base defines a groove; and
wherein the second engaging mechanism is arranged in the groove and is configured to be engaged with the transport robot.

14. The rack according to claim 13, wherein a side wall of the groove has a first surface facing away the storage body, and the first surface is configured to come into contact with the transport robot when the transport robot climbs along the second climbing assembly.

15. The rack according to claim 13, wherein an outer side of a side wall of the groove is provide with a guide rib, the guide rib has a second surface facing the storage body, and the second surface is configured to come into contact with the transport robot when the transport robot climbs along the second climbing assembly.

16. The rack according to claim 12, wherein the distance between adjacent support columns is greater than a maximum length dimension of the transport robot in a horizontal direction.

17. The rack according to claim 12, wherein a height of the bottom end of the second climbing assembly is greater than a height of the transport robot with a material carrying on before a lifting assembly of the transport robot is lifted, to allow the transport robot to move under the bottom end of the second climbing assembly; and
wherein the height of the bottom end of the second climbing assembly is less than a maximum height of the transport robot after the lifting assembly is lifted, to allow the transport robot to fit with the second climbing assembly.

18. A warehousing system comprising:
a transport robot comprising:
a robot body, and
a first climbing assembly connected to the robot body and capable of ascending or descending relative to the robot body; and
a rack comprising:
a rack body configured to store a material, the rack body defining a channel at a bottom of the rack body, the transport robot being able to pass through the channel when the transport robot transports a material; and
a second climbing assembly arranged on the rack body and extending in a vertical direction;
wherein a bottom end of the second climbing assembly has a height equal to or greater than a height of the channel;
wherein the first climbing assembly is configured to ascend relative to the robot body to be docked with the second climbing assembly to allow the transport robot to climb on the rack.

19. The warehousing system according to claim 18, wherein the first climbing assembly is located on one side of the robot body, while other sides of the robot body are free of the first climbing assembly.

20. The warehousing system according to claim 18, wherein the first climbing assembly comprises a support arm, a first roller and a second roller;
wherein the first roller and the second roller are arranged on the support arm, the first roller and the second roller are configured to be in rolling contact with the second climbing assembly when the transport robot climbs on the rack, and a direction of a force exerted by the first roller on the second climbing assembly is opposite to a direction of a force exerted by the second roller on the second climbing assembly.

21. A transport robot, comprising:
a body,
a walking wheel assembly mounted to the body;
a wheel driver connected to the walking wheel assembly, the wheel driver being configured to control the walking wheel assembly to steer so as to change a travelling direction of the transport robot;
a first climbing assembly arranged on the body, the first climbing assembly being configured to dock with a second climbing assembly of a rack, the first climbing assembly being further configured to climb along the second assembly in a vertical direction; and a fork assembly arranged on the body, the fork assembly being configured to retrieve or place materials;

wherein when the walking wheel assembly steers relative to the fork assembly so as to change the travelling direction of the transport robot, an orientation of the fork assembly remains unchanged.

\* \* \* \* \*